US011049222B2

(12) United States Patent
Yamamoto

(10) Patent No.: US 11,049,222 B2
(45) Date of Patent: Jun. 29, 2021

(54) SMOOTHING METHOD, SMOOTHING DEVICE, AND STORAGE MEDIUM STORING SMOOTHING PROGRAM

(71) Applicant: SEIKO EPSON CORPORATION, Tokyo (JP)

(72) Inventor: Yuko Yamamoto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 99 days.

(21) Appl. No.: 16/524,447

(22) Filed: Jul. 29, 2019

(65) Prior Publication Data

US 2020/0034952 A1 Jan. 30, 2020

(30) Foreign Application Priority Data

Jul. 30, 2018 (JP) .............................. JP2018-142614

(51) Int. Cl.
*G06T 5/00* (2006.01)
*H04N 9/31* (2006.01)
*H04N 1/60* (2006.01)

(52) U.S. Cl.
CPC .... *G06T 5/002* (2013.01); *G06T 2207/10024* (2013.01); *H04N 1/60* (2013.01); *H04N 9/3182* (2013.01)

(58) Field of Classification Search
CPC . G06T 5/002; G06T 2207/10024; H04N 1/60; H04N 9/3182
See application file for complete search history.

(56) References Cited

U.S. PATENT DOCUMENTS 5,974,173 A * 10/1999 Kimura ................ H04N 1/6019
358/523
7,773,252 B2 8/2010 Yoshida et al.
2003/0081831 A1* 5/2003 Fukao .................. H04N 1/6025
382/167

(Continued)

FOREIGN PATENT DOCUMENTS

JP 2003-179764 A 6/2003
JP 2005-094160 A 4/2005

(Continued)

*Primary Examiner* — Vu Le
*Assistant Examiner* — Julius Chenjun Chai
(74) *Attorney, Agent, or Firm* — Global IP Counselors, LLP

(57) ABSTRACT

A smoothing method of smoothing color values associated with a plurality of grid points that are arranged in a device-dependent color space and include a plurality of surface grid points arranged on a surface of a grid point region in which the plurality of grid points is arranged in the device-dependent color space includes calculating polynomial approximation coefficients to be used in a polynomial approximation equation for calculating approximate values of color values corresponding to positions in a first processing direction in the device-dependent color space for a plurality of first target grid points that are among the surface grid points and arranged in the first processing direction in the device-dependent color space, and smoothing color values associated with the first target grid points using the polynomial approximation equation when the color values associated with the first target grid points are to be smoothed.

14 Claims, 15 Drawing Sheets

(56) References Cited

U.S. PATENT DOCUMENTS

| | | | |
|---|---|---|---|
| 2005/0057762 A1* | 3/2005 | Yoshida | H04N 1/6033 358/1.9 |
| 2006/0245016 A1 | 11/2006 | Fukao et al. | |
| 2015/0356387 A1 | 12/2015 | Hirano | |

FOREIGN PATENT DOCUMENTS

| | | | |
|---|---|---|---|
| JP | 2013126121 A | * | 6/2013 |
| JP | 6075328 B2 | | 2/2017 |

* cited by examiner

FIG. 10
| | RESULT OF SEARCHING EXTREME GRID POINT | WEIGHT OF EXTREME GRID POINT |
|---|---|---|
| RESULT 1 | 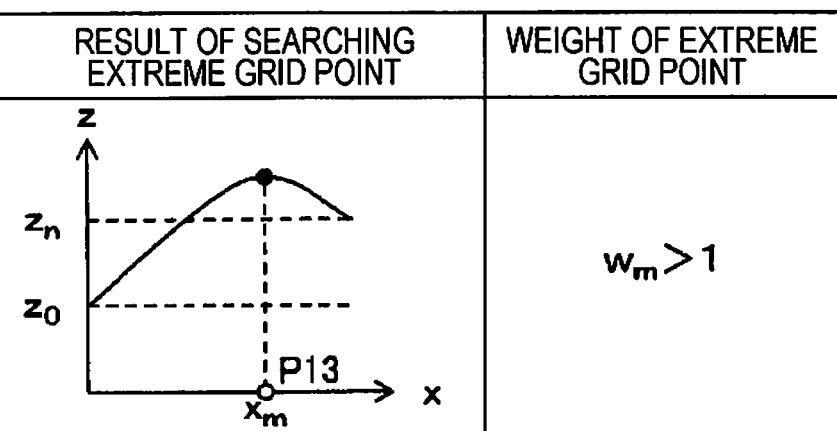 | $w_m > 1$ |
| RESULT 2 | 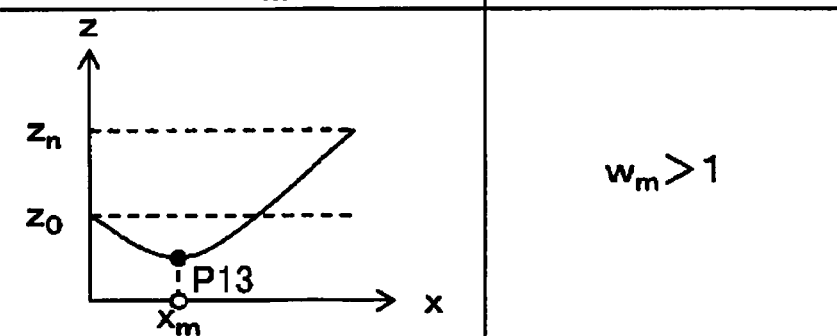 | $w_m > 1$ |
| RESULT 3 | 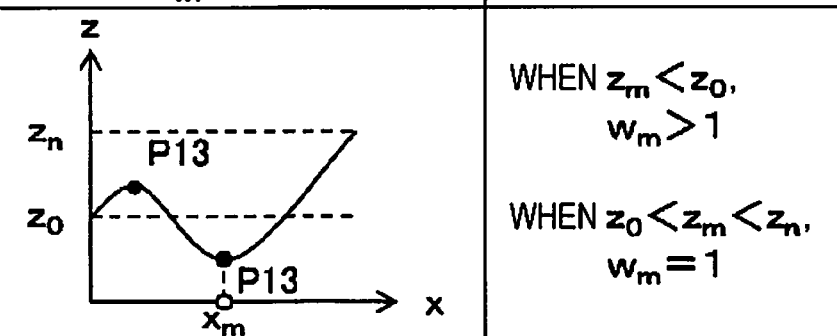 | WHEN $z_m < z_0$, $w_m > 1$<br><br>WHEN $z_0 < z_m < z_n$, $w_m = 1$ |
| RESULT 4 | 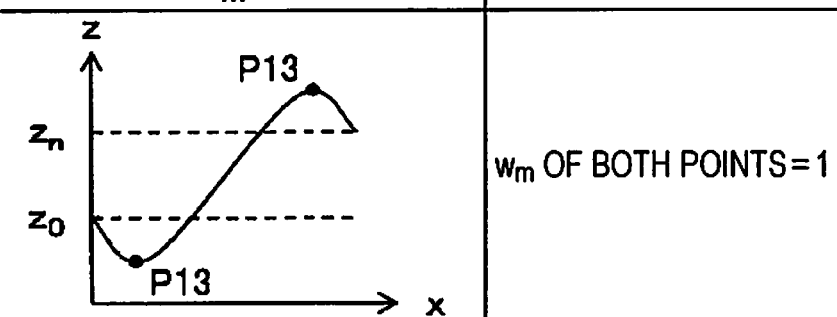 | $w_m$ OF BOTH POINTS = 1 |
| RESULT 5 | 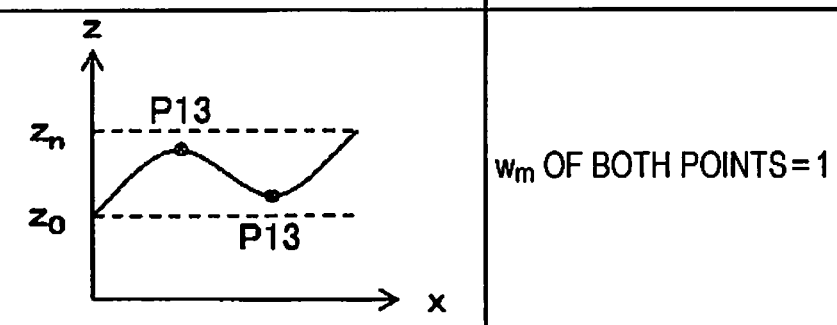 | $w_m$ OF BOTH POINTS = 1 |

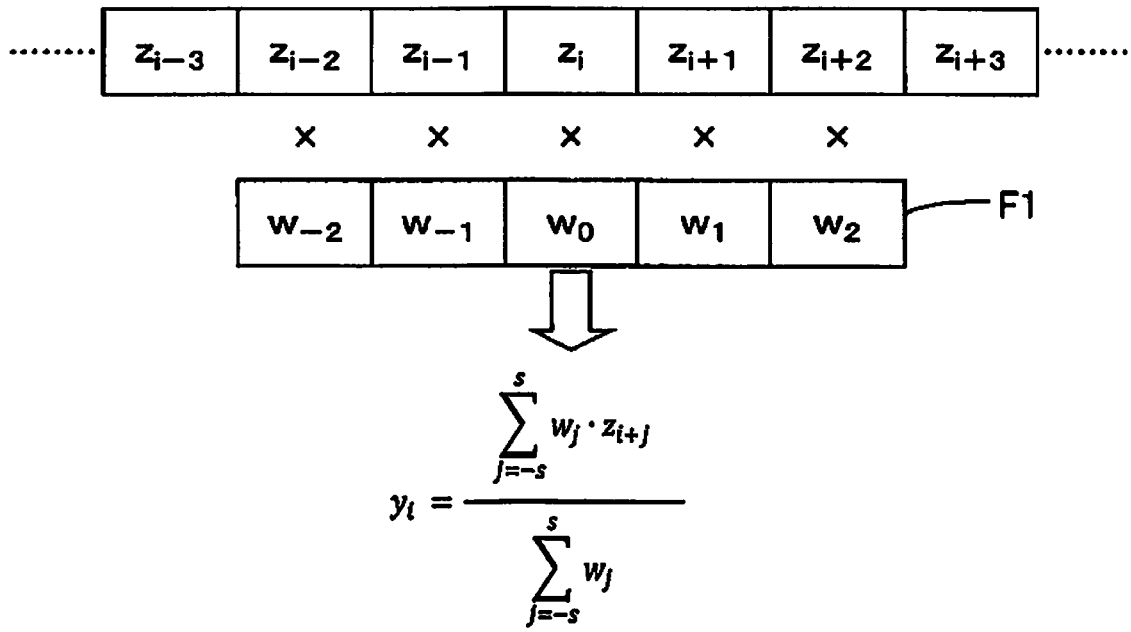

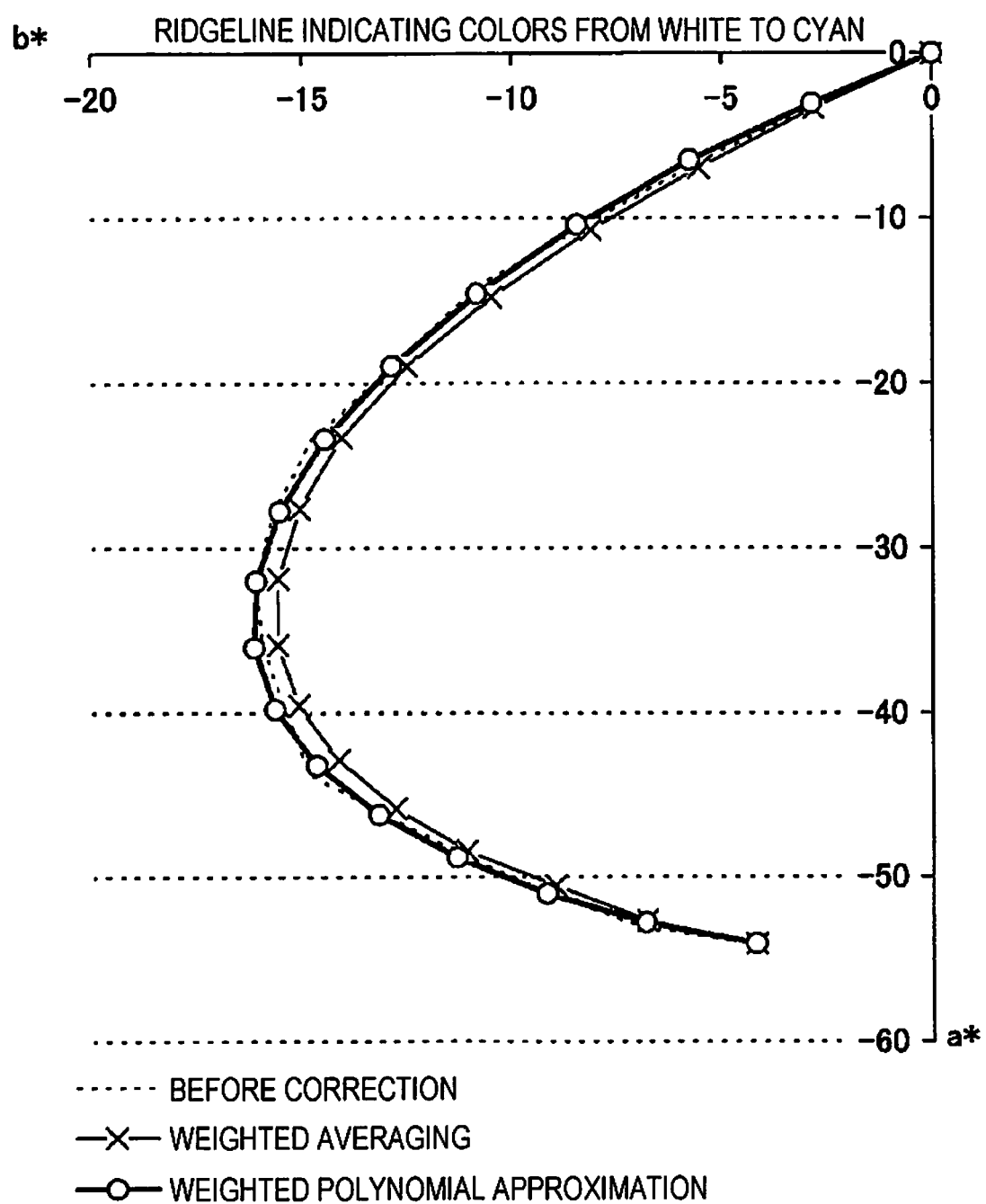

SMOOTHING METHOD, SMOOTHING DEVICE, AND STORAGE MEDIUM STORING SMOOTHING PROGRAM

The present application is based on, and claims priority from JP Application Serial Number 2018-142614, filed on Jul. 30, 2018, the disclosure of which is hereby incorporated by reference herein in its entirety.

BACKGROUND

1. Technical Field

The present disclosure relates to a smoothing technique for correcting color values associated with multiple grid points arranged in a device-dependent color space such as an RGB color space or a CMYK color space, where R indicates red, G indicates green, B indicates blue, C indicates cyan, M indicates magenta, Y indicates yellow, and K indicates black.

2. Related Art

A colorimetric value of a patch may adversely affect the accuracy of color prediction and may degrade a gradation due to a variation in a colorimeter, a variation in a colorimetric position, a variation in colors of patches, or the like in profile generation executed in a subsequent imaging process. Thus, a smoothing process is executed to improve the gradation. JP-A-2005-094160 describes a colorimetric data correction method of correcting colorimetric data of patches of colors associated with multiple grid points of a lattice cube set in an RGB color space. The colorimetric data is, for example, represented by color values of a CIE L*a*b color space that is a device-independent color space. CIE is the International Commission on Illumination. Hereinafter, "*" of L*a*b is omitted or L*a*b is referred to as Lab. Colorimetric data of grid points located on a ridgeline of the lattice cube is corrected to an average value of colorimetric data associated with grid points included in a predetermined range on the ridgeline, while a concerned grid point on the ridgeline is treated as the center of the predetermined range. Colorimetric data of grid points located on a surface of the lattice cube is corrected to an average value of colorimetric data associated with grid points included in a rectangular range in which a concerned grid point on the surface is the center of gravity.

When the aforementioned colorimetric data correction method is executed, a color reproduction range after the correction may be smaller than a color reproduction range before the correction. A method of correcting an outer surface of the lattice cube is important to suppress the reduction, caused by the correction, in the color reproduction range. Regarding the colorimetric data of the grid points on the surface of the lattice cube, it is important to minimize a change, caused by colorimetric before the correction, in the shape of a surface of gamut or color gamut or leave a trajectory of an outer edge of the gamut. It is important to not only minimize the change in the shape of the surface of the color gamut but also execute correction to enable smooth gradation expression. It is important to enable both the minimization and the correction.

SUMMARY

According to an aspect of the disclosure, a smoothing method is to execute a smoothing process on color values associated with multiple grid points arranged in a device-dependent color space.

The multiple grid points include multiple surface grid points arranged on a surface of a grid point region in which the multiple grid points are arranged in the device-dependent color space.

The smoothing method includes calculating polynomial approximation coefficients to be used in a polynomial approximation equation for calculating approximate values of color values corresponding to positions in a first processing direction in the device-dependent color space for multiple first target grid points that are among the multiple surface grid points and arranged in the first processing direction in the device-dependent color space.

The smoothing method includes smoothing color values associated with the first target grid points using the polynomial approximation equation when the color values associated with the first target grid points are to be smoothed.

In addition, according to another aspect of the disclosure, a smoothing device includes units corresponding to the coefficient calculation and smoothing of the smoothing method.

Furthermore, according to another aspect of the disclosure, a computer-readable storage medium stores a smoothing program for causing a computer to enable functions corresponding to the coefficient calculation and smoothing of the smoothing method.

BRIEF DESCRIPTION OF THE DRAWINGS

FIG. 6 is a diagram schematically showing an example in which lines to be subjected to the polynomial approximation are set on surfaces of a four-dimensional grid point region.

FIG. 10 is a diagram schematically showing an example of a weight of an extreme grid point excluding grid points located at both edges.

FIG. 14 is a diagram schematically showing an example of the smoothing.

FIG. 15 is a diagram schematically showing an example of a filter for calculating weighted averages of color values based on the smoothing intensity.

FIG. 16 is a diagram showing an example of a color reproduction range after the polynomial approximation executed on a ridgeline indicating colors from white to cyan, compared with weighted averaging executed on the ridgeline.

DESCRIPTION OF EXEMPLARY EMBODIMENTS

Hereinafter, an embodiment of the disclosure is described. The embodiment merely exemplifies the disclosure, and not all characteristics described in the embodiment may be necessary for the disclosure.

(1) Overview of Technique Included in Disclosure

First, an overview of a technique included in the disclosure is described with reference to examples shown in FIGS. 1 to 16. The drawings included in the present application schematically show the examples. Enlargement rates of the drawings in directions may vary and the drawings may not be matched. Elements of the present technique are not limited to specific examples indicated by reference symbols. In "the overview of the technique included in the disclosure", words in brackets indicate supplemental explanation of previous words.

In the present application, a range of values "Min to Max" indicates values equal to or larger than the minimum value Min and equal to or smaller than the maximum value Max.

First Aspect

Figure 1:
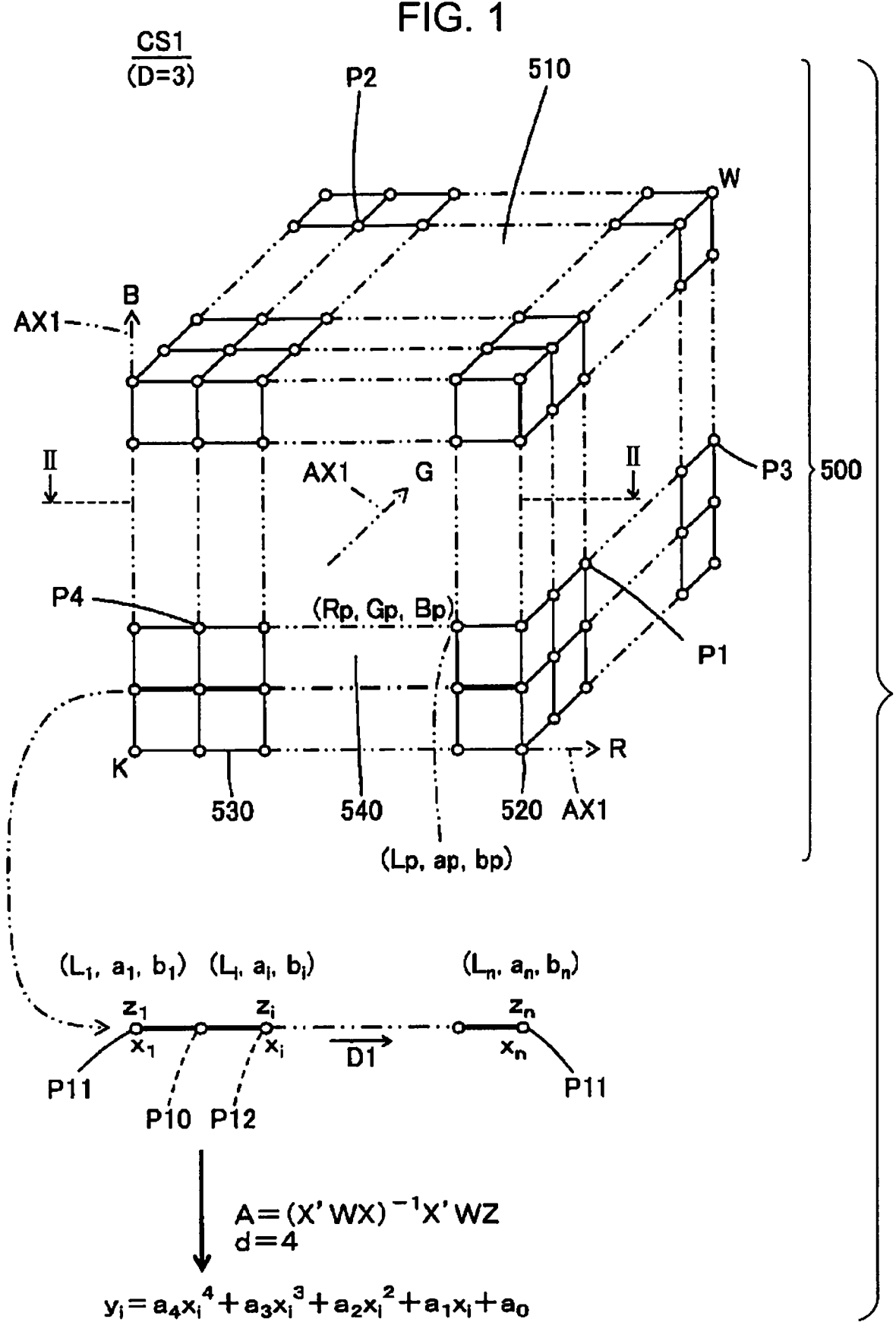
FIG. 1 is a diagram schematically showing an example of a grid point region in which multiple grid points are arranged in a device-dependent color space.

A smoothing method according to a first aspect of the present technique is to correct color values (for example, component values $L_i$, $a_i$, and $b_i$ in a Lab color space shown in FIG. 1) associated with multiple grid points P1 arranged in a device-dependent color space CS1. The smoothing method according to the first aspect includes a coefficient calculation process ST1 and a smoothing process ST2, as exemplified in FIG. 4. Color values $z_i$ exemplified in FIG. 1 collectively represent the component values $L_i$, $a_i$, and $b_i$. The multiple grid points P1 are arranged in a grid point region 500 of a lattice cube in the device-dependent color space CS1. The grid points P1 include multiple surface grid points P2 arranged on a surface 510 of the grid point region 500. In the coefficient calculation process ST1, polynomial approximation coefficients ($a_0$, ..., and $a_d$) are calculated for multiple first target grid points P10 that are among the multiple surface grid points P2 and arranged in the first processing direction D1 in the device-dependent color space CS1. The polynomial approximation coefficients ($a_0$, ..., and $a_d$) are used in a polynomial approximation equation for calculating approximate values (for example, approximate values $y_i$ shown in FIG. 1) of color values (for example, the color values $z_i$ shown in FIG. 1) corresponding to positions (for example, positions $x_i$ shown in FIG. 1) in the first processing direction D1 in the device-dependent color space CS1. The polynomial approximation coefficients include a constant number $a_0$ and can be calculated using a value of a determinant A exemplified in FIG. 1. When color values ($z_i$) associated with the first target grid points P10 are to be smoothed, the color values ($z_i$) associated with the first target grid points P10 are smoothed using the polynomial approximation equation.

In the first aspect, the polynomial approximation coefficients ($a_0$, ..., and $a_d$) are calculated for the multiple first target grid points P10 arranged on the surface 510 of the grid point region 500 and are used in the polynomial approximation equation for calculating the approximate values ($y_i$) of the color values ($z_i$) corresponding to the positions ($x_i$) in the first processing direction D1, the polynomial approximation equation is used upon the smoothing, and the color values ($z_i$) associated with the first target grid points P10 are smoothed. Thus, in the smoothing of color values associated with the multiple surface grid points P2, a variation in the color values ($z_i$) is reduced, and changes in the shape of a surface of original gamut at the positions ($x_i$) on the surface 510 of the grid point region 500 can be reduced. As a result, according to the first aspect, the smoothing method can be provided, which enables smooth gradation expression while suppressing a change in the shape of the gamut surface, compared with a case in which the color values associated with the multiple surface grid points are averaged.

The first processing direction may be changed and indicates a direction identifying the arrangement of the multiple first target grid points to be processed. Thus, for example, the coefficient calculation process and the smoothing process may be executed on a certain grid point as one of multiple first target grid points arranged in an R axis direction and may be executed on another grid point as one of multiple first target grid points arranged in a G axis direction.

In addition, a single direction may be set as the first processing direction, and the coefficient calculation process and the smoothing process may be executed on a single grid point. Alternatively, two directions may be set as the first processing direction, and the coefficient calculation process and the smoothing process may be executed on a single grid point. Thus, for example, the coefficient calculation process and the smoothing process may be executed on a certain grid point as one of the multiple target grid points arranged in the R axis direction and may be executed on the grid point as one of the multiple target grid points arranged in the G axis direction.

An effect of enabling smooth gradation expression while suppressing a change in the shape of the gamut surface as much as possible is obtained by executing the coefficient calculation process and the smoothing process on grid points in the first processing direction once. When two directions are set as the first processing direction, and the coefficient calculation process and the smoothing process are executed, smoother gradation expression is enabled.

In the device-dependent color space, a color to be perceived by a person may not be identified even when coordinate values are determined, and a color is defined depending on a color reproduction characteristic of a device. The device-dependent color space may include an RGB color space, a CMY color space, a CMYK color space, and the like.

A grid point indicates a virtual point arranged in the device-dependent color space as an input color space, and it is assumed that a color value as an output coordinate value corresponding to the position of the grid point in the input color space is stored in the grid point. The present technique includes a case in which multiple grid points may be arranged at even intervals in the input color space and a case in which multiple grid points may be arranged at uneven intervals in the input color space.

The color values include colorimetric values that are results of executing colorimetry on patches indicating colors of the grid points, calculated values indicating colors of the patches, and correction values calculated by an interpolation operation from the colorimetric values and the calculated values.

The polynomial approximation equation may be calculated by polynomial approximation executed to give the same weight to the first target grid points or may be calculated by weighted polynomial approximation executed to give different weights to some of the multiple first target grid points. Specifically, the polynomial approximation equation may include a weighted polynomial approximation equation. In addition, the polynomial approximation equation may be calculated by polynomial approximation using all the multiple first target grid points or may be calculated by polynomial approximation using a first target grid point selected from the multiple first target grid points.

When correction values associated with the first target grid points are referred to as first correction values, the first correction values may be approximate values or may be values calculated using the approximate values and color values.

The surface of the gamut is referred to as outer edge of the gamut in some cases, and the surface of the grid point region is referred to as outer edge of the grid point region in some cases.

The above additional remarks are applied to the following aspects.

Second Aspect

The first processing direction may be different from multiple axes included in the device-dependent color space as far as multiple surface grid points are arranged in the first processing direction. However, the first processing direction may be along any of axes AX1 included in the device-dependent color space CS1, as exemplified in FIG. 1 and the like. FIG. 1 shows that the first processing direction D1 is the R axis direction. The first processing direction D1, however, may be set to the G axis direction or a B axis direction. The first processing direction D1 may be set to a C axis direction, an M axis direction, a Y axis direction, or a K axis direction as far as the first processing direction D1 is set in the CMYK color space. According to a second aspect, a suitable technique for enabling smooth gradation expression while suppressing a change in the shape of the gamut surface as much as possible can be provided.

Third Aspect

As exemplified in FIG. 1 and the like, the device-dependent color space CS1 may be a D-dimensional color space with a number D of axes AX1, where the number D is 3 or more. The grid point region 500 may include a number $2^D$ of vertices 520. The surface 510 of the grid point region 500 may include multiple ridgelines 530 connecting the vertices 520 to each other and may include multiple sectioned surfaces 540 sectioned by the multiple ridgelines 530. Multiple sectioned surface grid points P4 that are among the multiple surface grid points P2 and arranged on the sectioned surfaces 540 may be arranged in a first axis direction and a second axis direction different from the first axis direction. The first axis direction and the second axis direction are determined based on the positions of the sectioned surfaces 540. For example, when the sectioned surfaces 540 are along an RG plane, the R axis direction may be set to the first axis direction and the G axis direction may be set to the second axis direction. As exemplified in FIG. 5 and the like, in the smoothing method, the first processing direction D1 may be set to the first axis direction, and the coefficient calculation process ST1 and the smoothing process ST2 may be executed on the multiple sectioned surface grid points P4. In the smoothing method, the first processing direction D1 may be set to the second axis direction, and the coefficient calculation process ST1 and the smoothing process ST2 may be executed on the multiple sectioned surface grid points P4. According to a third aspect, a suitable technique for enabling smooth gradation expression while suppressing a change in the shape of the gamut surface as much as possible can be provided.

Fourth Aspect

Figure 9:
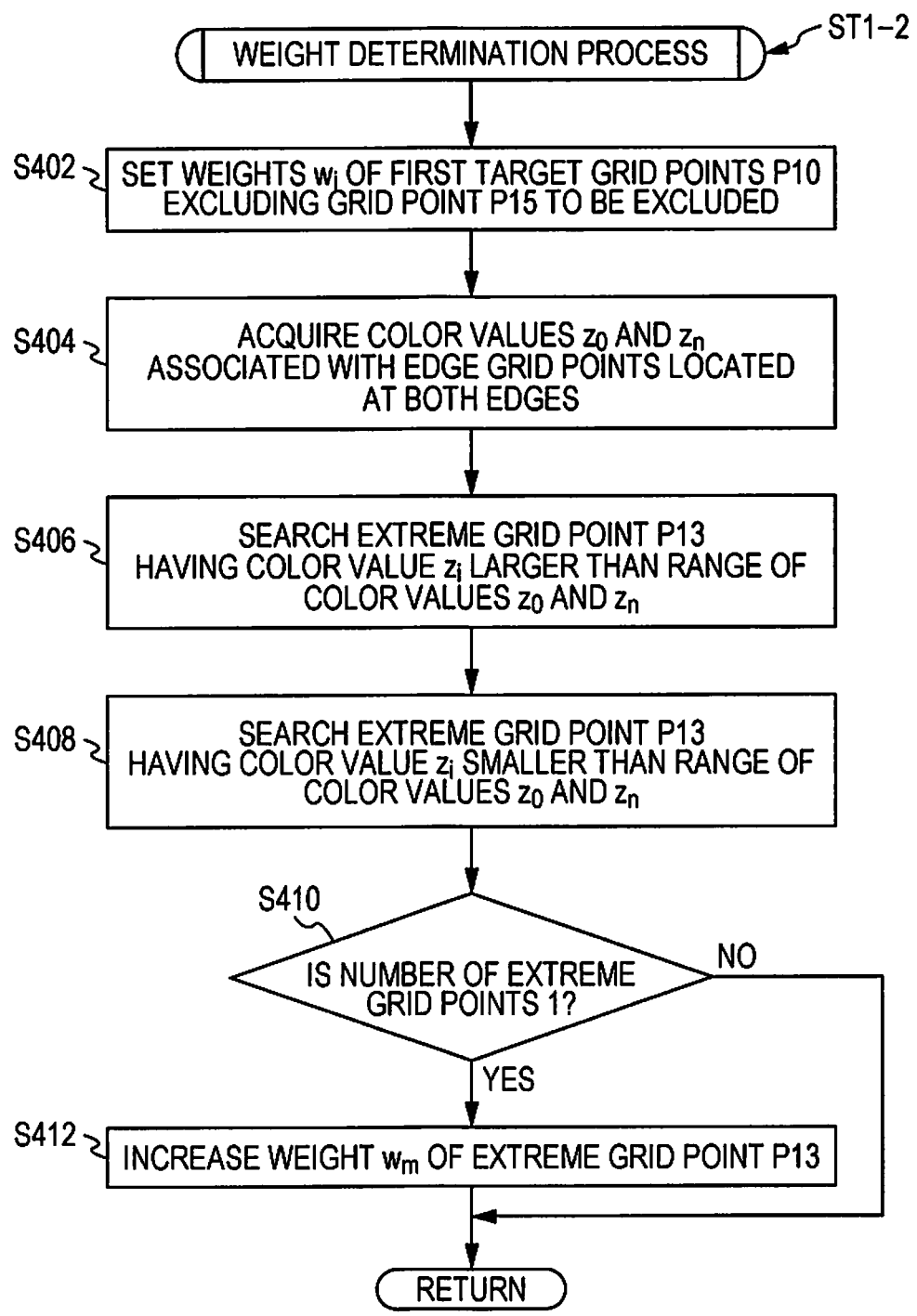
FIG. 9 is a flowchart of an example of a weight determination process.

As exemplified in FIGS. 1, 9, and 10, the polynomial approximation coefficients may include weighted polynomial approximation coefficients to be used in the weighted polynomial approximation equation for calculating the approximate values of the color values ($z_i$) corresponding to the positions ($x_i$) in the first processing direction D1 in the device-dependent color space CS1. In the coefficient calculation process, weights (for example, weights $w_i$) of the first target grid points P10 may be determined based on the color values ($z_i$) associated with the multiple first target grid points P10, and the weighted polynomial approximation coefficients may be calculated based on the determined weights ($w_i$). According to a fourth aspect, the smoothing method can be provided, which is suitable to enable smooth gradation expression while suppressing a change in the shape of the original gamut surface by the weighted polynomial approximation process using the weighted polynomial approximation coefficients, compared with the case in which the color values associated with the multiple surface grid points are averaged.

Fifth Aspect

As exemplified in FIGS. 1, 9, and 10, in the coefficient calculation process, when a single extreme grid point P13 having a color value ($z_i$) that serves as an extreme and is any of the color values ($z_i$) corresponding to the positions ($x_i$) and is larger or smaller than color values ($z_1$ and $z_n$) associated with edge grid points P11 that are among the multiple first target grid points P10 and located at both edges in the first processing direction D1 exists among the multiple first target grid points P10, a weight ($w_m$) of the extreme grid point P13 may be the largest among the weights (for example, $w_i$) of the first target grid points P10, and the weighted polynomial approximation coefficients may be calculated. Thus, on the surface 510 of the grid point region 500, a change in the shape of the original gamut surface can be reduced. As a result, according to a fifth aspect, the smoothing method can be provided, which is suitable to enable smooth gradation expression while suppressing a change in the shape of the original gamut surface, compared with the case in which the color values associated with the multiple surface grid points are averaged.

Extremes include a local maximum value and a local minimum value. This additional remark is applied to the following aspects.

Sixth Aspect

Figure 8:
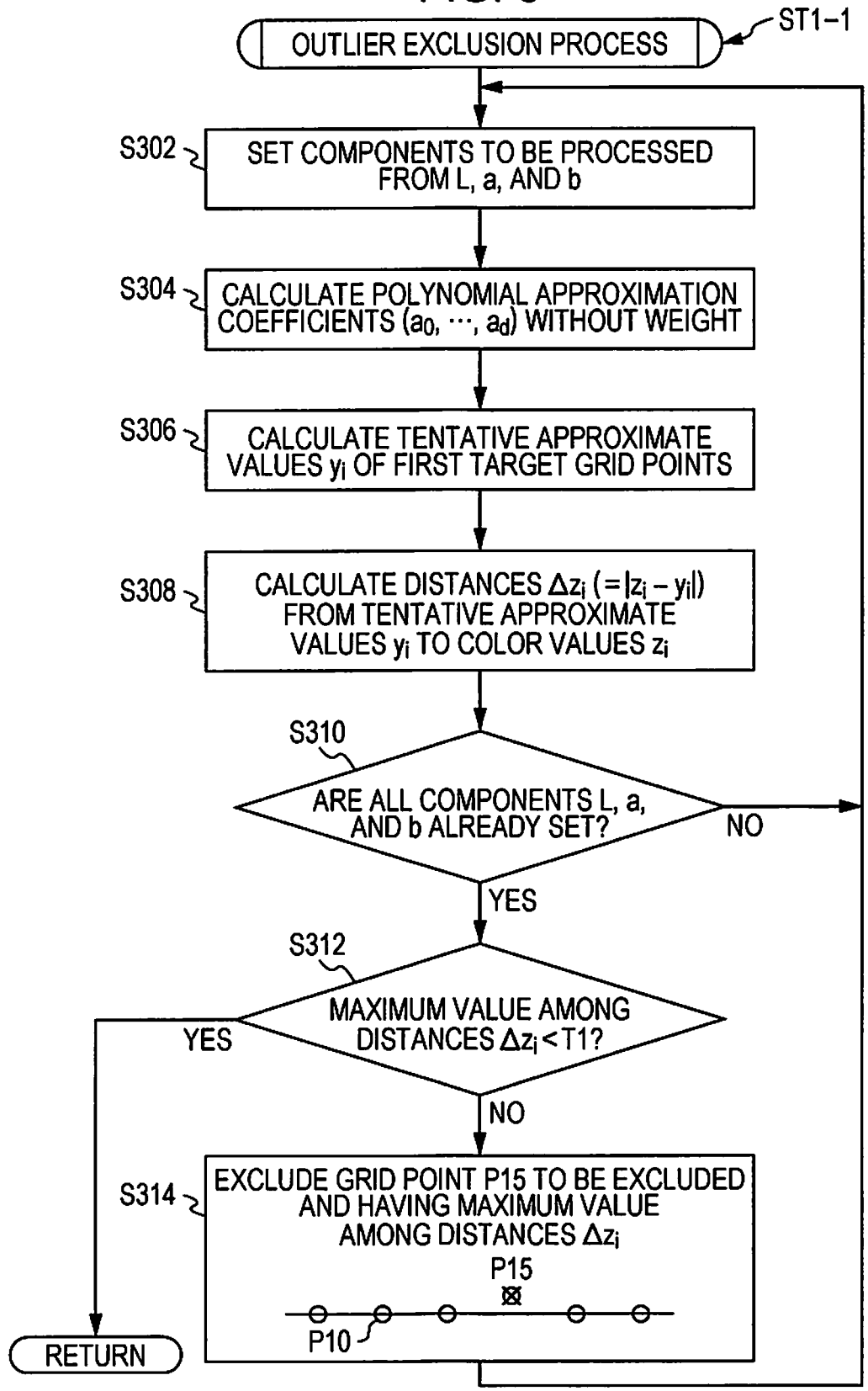
FIG. 8 is a flowchart of an example of an outlier exclusion process.

As exemplified in FIG. 8, in the coefficient calculation process, whether a grid point P1 that is included in the multipole first target grid points P10 is a grid point P15 that is to be excluded and is not to be used for the calculation of the polynomial approximation coefficients may be determined based on the color values ($z_i$) associated with the multiple first target grid points P10, the grid point P15 to be excluded may be excluded from the multiple first target grid points P10, and the polynomial approximation coefficients may be calculated. In a sixth aspect, an approximate curve that is close to true values can be calculated by excluding a grid point with an inappropriate color value. Thus, according to the sixth aspect, the smoothing method can be provided, which is suitable to enable smooth gradation expression by a smoothing process executed by the polynomial approximation (including the weighted polynomial approximation)

in a subsequent process while suppressing a change in the shape of the original gamut surface as much as possible.

Seventh Aspect

As exemplified in FIG. 1 and the like, the device-dependent color space CS1 may be a D-dimensional color space with a number D of axes AX1, where the number D is 3 or more. The grid point region 500 may include a number $2^D$ of vertices 520. The surface 510 of the grid point region 500 may include multiple ridgelines 530 connecting the vertices 520 to each other and may include multiple surfaces 540 sectioned by the multiple ridgelines 530. As exemplified in FIG. 5, according to a seventh aspect, in the smoothing method, after the coefficient calculation process and the smoothing process are executed on multiple ridgeline grid points P3 that are among the multiple surface grid points P2 and arranged on the ridgelines 530, the coefficient calculation process and the smoothing process may be executed on the multiple sectioned surface grid points P4 that are among the multiple surface grid points P2 and arranged on the sectioned surfaces 540. Color values associated with the sectioned surface grid points P4 are smoothed after the smoothing of color values associated with the multiple ridgeline grid points P3 in the seventh aspect. Thus, according to the seventh aspect, the smoothing method can be provided, which is suitable to enable smooth gradation expression while suppressing a change in the shape of the original gamut surface, compared with the case in which the color values associated with the multiple surface grid points are averaged.

Eighth Aspect

Figure 2:
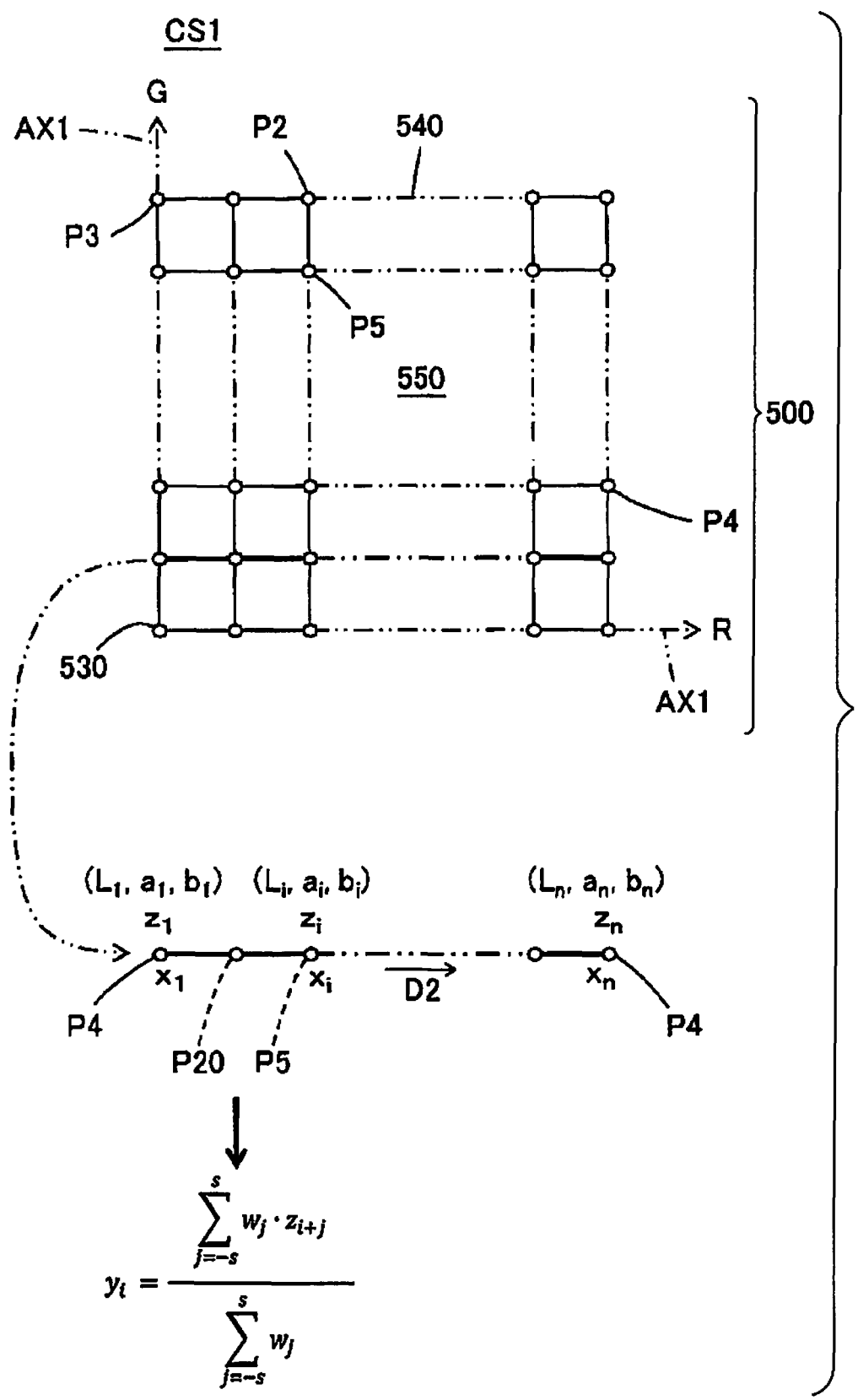
FIG. 2 is a diagram schematically showing an example of a cross-section, taken along a line II-II shown in FIG. 1, of the grid point region.

As exemplified in FIG. 2 and the like, the multiple grid points P1 may include multiple internal grid points P5 arranged in an internal region 550 included in the grid point region 500. As exemplified in FIG. 4, according to an eighth aspect, the smoothing method may further include an internal smoothing process ST3 of smoothing color values ($z_i$) associated with the internal grid points P5 by a smoothing process different from the smoothing process using the polynomial approximation equation. Smoothing that is different from polynomial approximation is executed on the color values associated with the internal grid points P5 and the smoothing is executed by the polynomial approximation (including the weighted polynomial approximation) on color values associated with the surface grid points in the eighth aspect. Thus, according to the eighth aspect, the smoothing method can be provided, which is suitable to enable smooth gradation expression while suppressing a change in the shape of the original gamut surface as much as possible.

Ninth Aspect

As exemplified in FIGS. 2 and 14 and the like, in the internal smoothing process, weighted averages ($y_i$) of color values associated with grid points including grid points adjacent to each other in a second processing direction D2 may be associated with multiple second target grid points P20 that are among the multiple internal grid points P5 and arranged in the second processing direction D2 in the device-dependent color space CS1. In a ninth aspect, the color values associated with the internal grid points P5 are corrected to the weighted averages ($y_i$) including the color values associated with the grid points including the grid points P1 adjacent to each other in the second processing direction D2.

The weighted averages of the color values associated with the grid points may be values calculated when a coefficient of 0 is included. The weighted averages of the color values associated with the grid points may be values calculated when all the coefficients are the same. Thus, the ninth aspect includes the case where the original color values associated with the internal grid points to be processed are corrected to the weighted averages since the coefficients for the color values associated with the internal grid points to be processed are 1. The ninth aspect also includes the case where simple averages of the original color values associated with the grid points are the weighted averages since all the coefficients are the same. The color values associated with the internal grid points P5 are smoothed using the weighted averages and the smoothing process is executed to use the polynomial approximation (including the weighted polynomial approximation) to smooth the color values associated with the surface grid points in the ninth aspect. Thus, according to the ninth aspect, the smoothing method can be provided, which is suitable to enable smooth gradation expression while suppressing a change in the shape of the original gamut surface as much as possible.

The second processing direction may be changed and indicates a direction identifying the arrangement of the multiple second target grid points to be processed. Thus, for example, the internal smoothing process may be executed on a certain grid point as one of multiple second target grid points arranged in the R axis direction and may be executed on another grid point as one of multiple second target grid points arranged in the G axis direction.

In addition, a single direction may be set as the second processing direction and the internal smoothing process may be executed on a single grid point. Alternatively, two or more directions may be set as the second processing direction and the internal smoothing process may be executed on a single grid point. Thus, for example, the internal smoothing process may be executed on a certain grid point as one of the second target grid points arranged in the R axis direction, and may be executed on the certain grid point as one of the second target grid points arranged in the G axis direction, and may be executed on the certain grid point as one of second target grid points arranged in the B axis direction.

The above additional remarks are applied to the following aspects.

Tenth Aspect

The second processing direction may be different from the multiple axes included in the device-dependent color space as far as multiple internal grid points are arranged in the second processing direction. As exemplified in FIG. 2 and the like, the second processing direction may be along any of the multiple axes AX1 included in the device-dependent color space CS1. FIG. 2 shows that the second processing direction D2 is the R axis direction. The first processing direction D1, however, may be set to the G axis direction or the B axis direction. When the first processing direction D1 is set in the CMYK color space, the first processing direction D1 may be set to the C axis direction, the M axis direction, the Y axis direction, or the K axis direction. According to a tenth aspect, a suitable technique for enabling smooth gradation expression while suppressing a change in the shape of the original gamut surface as much as possible can be provided.

Eleventh Aspect

As exemplified in FIG. 1 and the like, the device-dependent color space CS1 may be a D-dimensional color space with a number D of axes AX1, where the number D is 3 or more. As exemplified in FIG. 2 and the like, the multiple internal grid points P5 may be arranged in axis directions that are along the number D of axes AX1. According to an eleventh aspect, in the smoothing method, the second processing direction D2 may be sequentially set to the number D of axes AX1, each of the axis directions may be sequentially treated as the second processing direction D2, and the internal smoothing process ST3 may be executed on the multiple internal grid points P5.

According to the eleventh aspect, a suitable technique for enabling smooth gradation expression while suppressing a change in the shape of the original gamut surface as much as possible can be provided.

Twelfth Aspect

Figure 4:
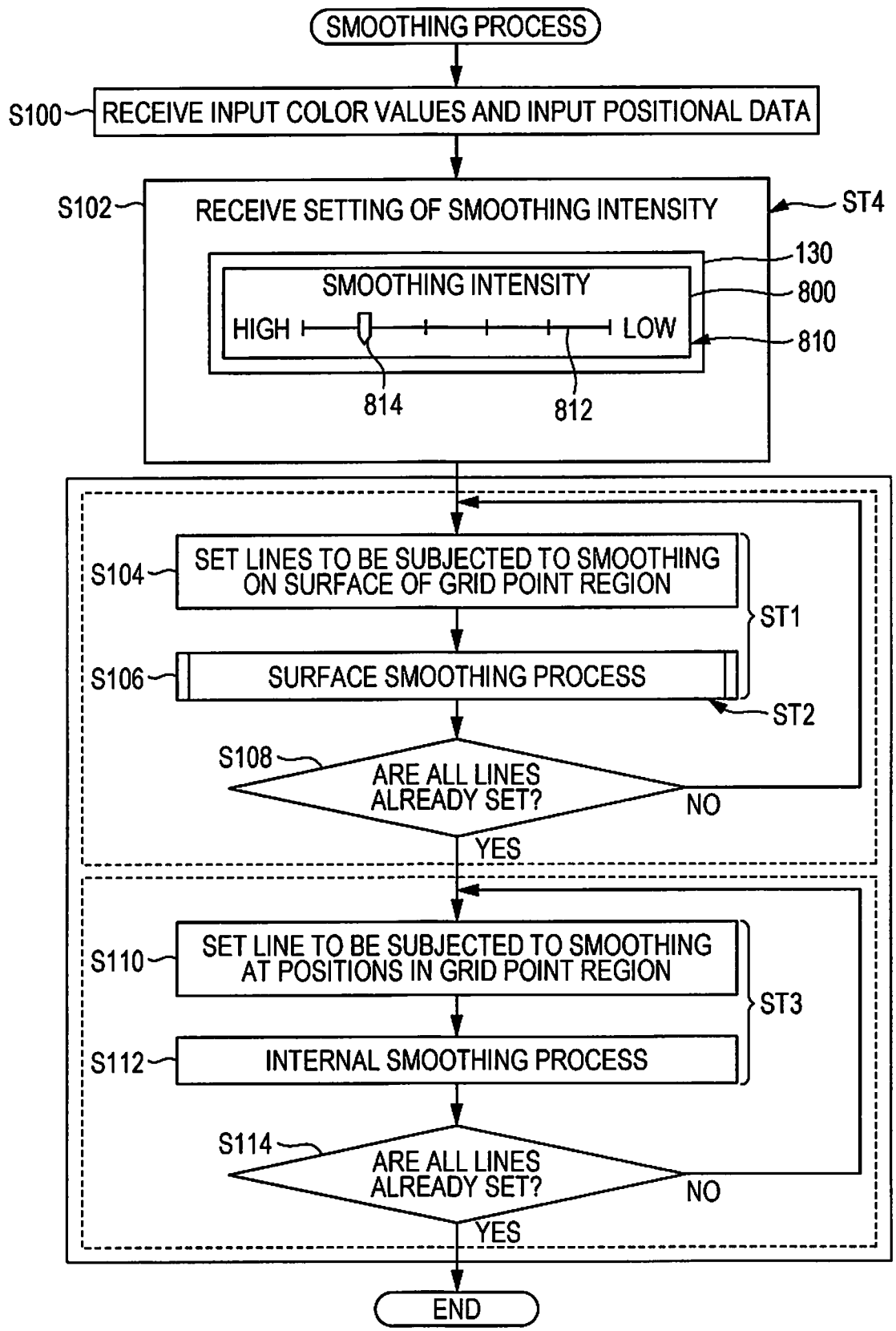
FIG. 4 is a flowchart of an example of a smoothing process.

As exemplified in FIG. 4, according to a twelfth aspect, the smoothing method may further include a smoothing intensity reception process ST4 of receiving a setting of an intensity (for example, a rate c shown in FIG. 12) of the smoothing. In the smoothing process ST2, a weight for the approximate values obtained using the polynomial approximation equation may be treated as the rate (c) based on the intensity, weighted averages (for example, first correction values $r_i$ shown in FIG. 12) of approximate values ($y_i$) of the first target grid points P10 and the color values ($z_i$) associated with the first target grid points P10 may be associated with the first target grid points P10. According to the twelfth aspect, a technique for smoothing color values of the internal grid points based on user's preference can be provided.

Thirteenth Aspect

A smoothing device (for example, a host device 100 shown in FIG. 3) according to a thirteenth aspect of the present technique includes a coefficient calculating unit U1 and a smoothing unit U2. The coefficient calculating unit U1 corresponds to the coefficient calculation process ST1. The smoothing unit U2 corresponds to the smoothing process ST2. According to the thirteenth aspect, the smoothing device can be provided, which enables smooth gradation expression while suppressing a change in the shape of the original gamut surface as much as possible. The smoothing device may include an internal smoothing unit U3 and a smoothing intensity receiving unit U4. The internal smoothing unit U3 corresponds to the internal smoothing process ST3. The smoothing intensity receiving unit U4 corresponds to the smoothing intensity reception process ST4.

Fourteenth Aspect

A smoothing program PRO according to a fourteenth aspect of the present technique causes a computer (for example, the host device 100 shown in FIG. 3) to enable a coefficient calculating function FU1 and a smoothing function FU2. The coefficient calculating function FU1 corresponds to the coefficient calculation process ST1. The smoothing function FU2 corresponds to the smoothing process ST2. According to the fourteenth aspect, the smoothing program PRO can be provided, which enables smooth gradation expression while suppressing a change in the shape of the original gamut surface as much as possible. The smoothing program PRO may cause the computer to enable an internal smoothing function FU3 and a smoothing intensity receiving function FU4. The internal smoothing function FU3 corresponds to the internal smoothing process ST3. The smoothing intensity receiving function FU4 corresponds to the smoothing intensity reception process ST4.

In addition, the present technique is applicable to a complex device including the smoothing device, a method of controlling the smoothing device, a method of controlling the complex device, a program for controlling the smoothing device, a program for controlling the complex device, a computer-readable storage medium storing the smoothing program and the control programs, and the like. Each of the devices may be composed of multiple units.

(2) Overview of Smoothing Method According to Specific Example

FIG. 1 schematically exemplifies the grid point region 500 in which the multiple grid points P1 are arranged in the device-dependent color space CS1. A lower portion of FIG. 1 schematically exemplifies the first target grid points P10 arranged in the first processing direction D1 on the surface 510 of the grid point region 500. The first processing direction D1 shown in FIG. 1 is the R axis direction but may be changed to the G axis direction or the B axis direction. FIG. 2 schematically exemplifies a cross-section, taken along a line II-II shown in FIG. 1, of the grid point region 500. A lower portion of FIG. 2 schematically exemplifies the multiple second target grid points P20 arranged in the second processing direction D2 at positions extending in the internal region 550 included in the grid point region 500. The second processing direction D2 shown in FIG. 2 is the R axis direction but may be changed to the G axis direction or the B axis direction. In FIGS. 1 and 2, R indicates the R axis, G indicates the G axis, and B indicates the B axis. In FIGS. 1 and 2, K indicates a black point at which the amounts of R, G, and B components are the smallest, and W indicates a white point at which the amounts of R, G, and B components are the largest.

The device-dependent color space CS1 shown in FIG. 1 is a three-dimensional RGB color space with 3 axes AX1. The three axes AX1 are the R axis, the G axis, and the B axis. A number n of grid points P1 are arranged at substantially even intervals in each of the axis directions or in each of directions of the axes AX1. The number n of grid points P1 arranged in each of the axis directions is not limited but may be three or more or may be in a range of 9 to 64.

When a point of origin is indicated by 0 and the positions of the grid points P1 arranged in the axis directions are indicated by integers, the maximum value among the integers indicating the positions may not be exactly divisible by (n−1). In this case, an interval between adjacent grid points P1 may be a quotient of the division of the maximum value among the integers indicating the positions by (n−1) or may be a value obtained by adding 1 to the quotient. In this case, the grid points P1 are arranged at substantially even intervals in the axis directions.

Since the number n of grid points P1 are arranged in each of the axis directions, a number $n^D$ of grid points P1 or a number $n^3$ of grid points P1 are included in the grid point region 500. Color values (Lp, ap, and bp) in the Lab color space, which is a device-independent color space, are associated with the grid points P1. A component L in the Lab color space indicates lightness. Components a and b in the Lab color space indicate chromaticity. The color values (Lp, ap, and bp) of the grid points P1 are stored in a color conversion table 400 that is a lookup table. The color conversion table 400 includes data indicating correspondence relationships between coordinate values (Rp, ap, and bp) in the RGB color space and coordinate values or color values (Lp, ap, and bp) in the Lab color space. The RGB color space is an input color space. The Lab color space is an output color space. The color values (Lp, ap, and bp) are, for example, obtained by causing a colorimeter to execute colorimetry on patches of colors corresponding to input coordinate values (Rp, ap, and bp) of the grid points P1. The patches are also referred to as color charts. The color values (Lp, ap, and bp) are not limited to colorimetric values that are results of executing the colorimetry on the patches. The color values (Lp, ap, and bp) may be values calculated from the colorimetric values, values calculated from colorimetric values of other patches, simulation values, or the like. When an ICC profile is generated or adjusted, an A2B table included in the ICC profile is applicable to the color conversion table 400. ICC is an abbreviation for International Color Consortium.

The colorimetric values may adversely affect the accuracy of color prediction and degrade a gradation due to a variation in the colorimeter, a variation in a colorimetric position, a variation in colors of the patches, or the like in the generation of a profile in a subsequent imaging process. In a specific example, since color values, each of which may vary, are smoothed, polynomial approximation is applied to the color values ($L_i$, $a_i$, and $b_i$) associated with the multiple first target grid points P10 arranged in the first processing direction D1 along an axis direction on the surface 510 of the grid point region 500. Thus, the smoothing method can be provided, which enables smooth gradation expression while suppressing a change in the shape of the gamut surface as much as possible, compared with the case in which the color values associated with the multiple surface grid points are averaged.

The device-dependent color space CS1 to which the present technique is applicable is not limited to the RGB color space and may be the CMY color space, the four-dimensional CMYK color space with four axes, or the like.

An overview of a method of correcting a color value is described below. In the following description, a color value associated with a grid point is referred to as color value of the grid point in some cases.

The surface 510 of the grid point region 500 shown in FIGS. 1 and 2 includes the multiple ridgelines 530 extending in the axis directions and includes the multiple surfaces 540 sectioned by the multiple ridgelines 530. The vertices 520 of the grid point region 500 are located at positions at which the ridgelines 530 intersect with each other. Specifically, the ridgelines 530 connect the vertices 520 to each other. For the convenience of a process described later, it is assumed that the ridgelines 530 include the vertices 520 and that the sectioned surfaces 540 do not include the ridgelines 530. In the D-dimensional device-dependent color space CS1, a number $2^D$ of vertices 520 of the grid point region 500 exist. In the three-dimensional RGB color space, the grid point region 500 is treated as a rectangular parallelepiped and includes 8 ($=2^3$) vertices 520, 12 ridgelines 530, and 8 sectioned surfaces 540. Although not shown, the grid point region 500 includes 16 ($=2^4$) vertices 520, 32 ridgelines 530, and 24 sectioned surfaces 540 in the four-dimensional CMYK color space.

For the convenience of the description, the multiple grid points P1 included in the grid point region 500 are classified as follows.

The multiple grid points P1 include the multiple surface grid points P2 arranged on the surface 510 of the grid point region 500 and the multiple internal grid points P5 arranged in the internal region 550 included in the grid point region 500. The multiple surface grid points P2 include the multiple ridgeline grid points P3 arranged on the ridgelines 530 and the multiple sectioned surface grid points P4 arranged on the sectioned surfaces 540. It is assumed that multiple first target grid points P10, which are among the multiple surface grid points P2 and to be subjected to the polynomial approximation, are arranged in the first processing direction D1 that is any of the multiple axis directions. The multiple first target grid points P10 shown in FIG. 1 include the two edge grid points P11 located at the edges in the R axis direction and multiple intermediate grid points P12 located between the edge grid points P11. The R axis direction is an example of the first processing direction D1. It is assumed that the multiple second target grid points P20 that are located at the positions extending in the internal region 550 of the grid point region 500 and to be subjected to weighted averaging are arranged in the second processing direction D2 that is any of the multiple axis directions. The multiple second target grid points P20 shown in FIG. 2 include two sectioned surface grid points P4 located at edges in the R axis direction and multiple internal grid points P5 located between the sectioned surface grid points P4. The R axis direction is an example of the second processing direction D2.

As shown in FIG. 1, it is assumed that the positions of the number n of the first target grid points P10 arranged in the first processing direction D1 are $x_i$ in the first processing direction D1 and that the color values associated with the first target grid points P10 are ($L_i$, $a_i$, and $b_i$). In this case, i is a variable identifying a first target grid point P10 and is in a range of integers of 1 to n. Each of color values $z_i$ indicates any of a lightness component L, a chromaticity component a, and a chromaticity component b. When fourth-order polynomial approximation is executed, an approximation equation for calculating the approximate values $y_i$ of the color values $z_i$ corresponding to the positions $x_i$ is expressed by the following Equation (1).

$$y_i = a_4 x_i^4 + a_3 x_i^3 + a_2 x_i^2 + a_1 x_i + a_0 \tag{1}$$

In this case, $a_0$, $a_1$, $a_2$, $a_3$, and $a_4$ indicate polynomial approximation coefficients for $x_i^0$, $x_i^1$, $x_i^2$, $x_i^3$, and $x_i^4$. FIG. 1 shows that the degree d of the polynomial approximation is 4. The degree d may be 3 or may be 5 or more.

Generally, weighted polynomial approximation coefficients $a_0$, . . . , and $a_d$ can be calculated according to the following Equation (2).

$$A = (X'WX)^{-1} X'WZ \tag{2}$$

In Equation (2), X indicates a matrix of a number n of rows and a number (d+1) of columns. The matrix X has a number (d+1) of components in an i-th row. For example, the matrix X has $x_i^0$, $x_i^1$, $x_i^2$, $x_i^3$, and $x_i^4$ in the i-th row. X' indicates a transpose of the matrix X. Z indicates a matrix of a number n of rows and one column. The matrix Z has a color value $z_i$ in an i-th row. W indicates a matrix of a number n of rows and a number n of columns. The matrix W has a weight in an i-th row and an i-th column. Other components of the matrix W indicate 0. When all weights are 1, the polynomial approximation is executed without a weight. When a weight that is not 1 exists, the weighted polynomial approximation is executed.

The calculated approximate values $y_i$ may be associated with the first target grid points P10 and may serve as the first correction values. Alternatively, the calculated approximate values $y_i$ may be converted to the first correction values based on a set smoothing intensity and may be associated with the first target grid points P10.

As shown in FIG. 2, it is assumed that the positions of the number n of second target grid points P20 arranged in the second processing direction D2 are $x_i$ in the second processing direction D2 and that color values associated with the second target grid points P20 are ($L_i$, $a_i$, and $b_i$). In this case, i is a variable identifying a second target grid point P20 and is in a range of integers of 1 to n. Each of the color values $z_i$ indicates any of a lightness component L, a chromaticity component a, and a chromaticity component b. When color values $z_i$ of the internal grid points P5 are to be corrected, the color values $z_i$ of the internal grid points P5 are corrected to the weighted averages of the color values of the grid points including the grid points adjacent to each other in the second processing direction D2. When the weighted averages are $y_i$, the weighted averages $y_i$ are expressed by the following Equation (3).

$$y_i = \frac{\sum_{j=-s}^{s} w_j \cdot z_{i+j}}{\sum_{j=-s}^{s} w_j} \quad (3)$$

In Equation (3), s indicates a positive integer indicating a range of grid points to be subjected to the weighted averaging. For example, when s=1, three grid points including grid points located at both edges in the second processing direction D2 are used. When s=2, five grid points including the grid points located at the edges in the second processing direction D2 are used. In Equation (3), j is a variable that identifies a grid point to be used and is in a range of integers of −s to s. In Equation (3), $z_{i+j}$ indicates a color value of a grid point to be used for the weighted averaging, and $w_j$ indicates a weight for a grid point to be used for the weighted averaging. When all weights $w_j$ are the same or are, for example, 1, obtained weighted averages $y_i$ are simple averages. The simple averages are included in the weighted averages $y_i$.

The obtained weighted averages $y_i$ are associated with the second target grid points P20 and treated as second correction values.

(3) Specific Example of Configuration of Smoothing System

Figure 3:
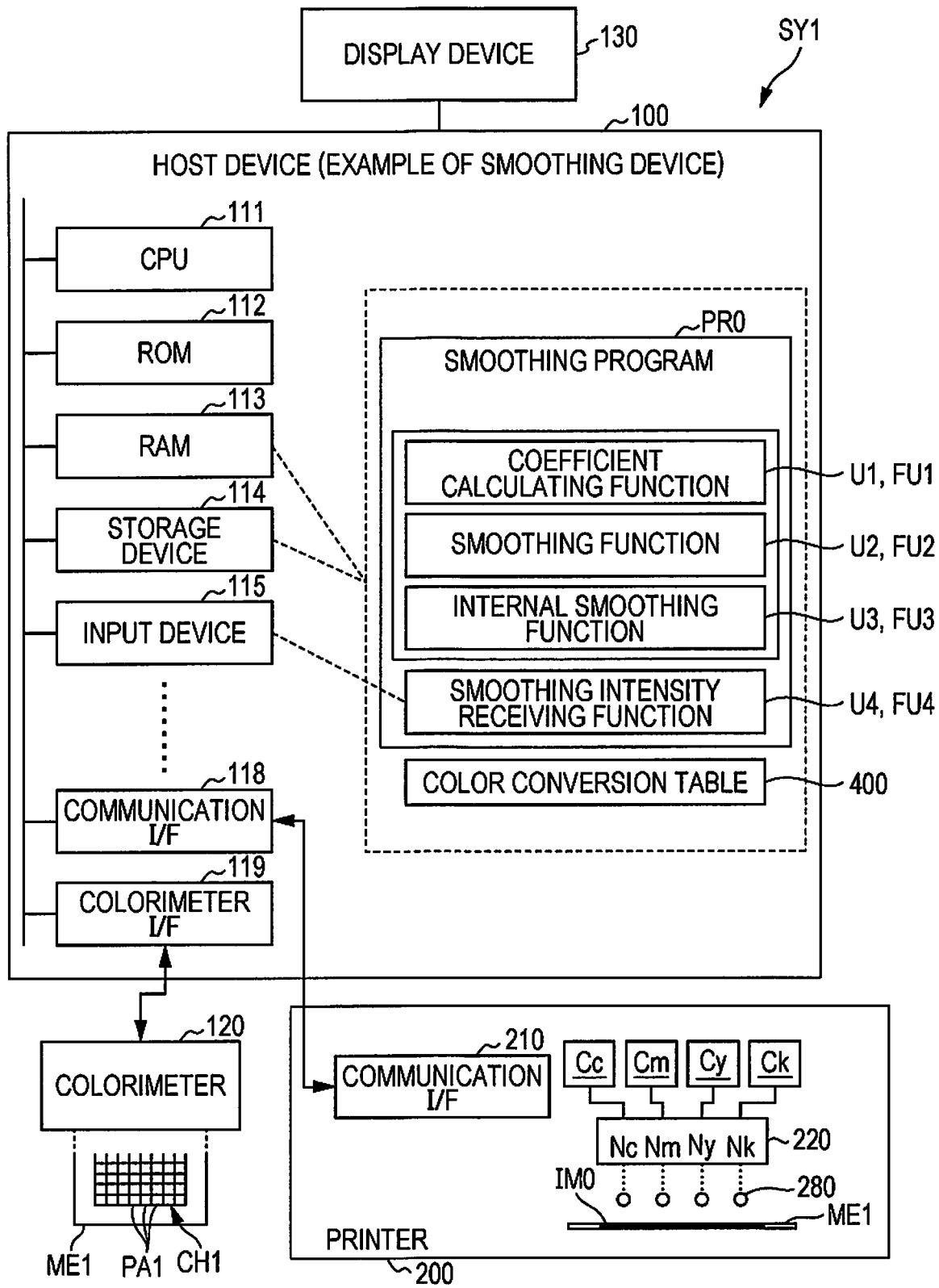
FIG. 3 is a block diagram schematically showing an example of a configuration of a smoothing system.

FIG. 3 schematically exemplifies a configuration of a smoothing system SY1. The smoothing system SY1 includes the host device 100, a display device 130, a colorimeter 120, and an ink jet printer 200. The host device 100 is an example of the smoothing device. In the host device 100, a CPU 111, a ROM 112, a RAM 113, a storage device 114, an input device 115, a communication I/F 118, a colorimeter I/F 119, and the like are connected to each other and receive and output information from and to each other. CPU is an abbreviation for central processing unit. ROM is an abbreviation for read only memory. RAM is an abbreviation for random access memory. I/F is an abbreviation for interface. The ROM 112, the RAM 113, and the storage device 114 are memories. At least the ROM 112 and the RAM 113 are semiconductor memories. The display device 130 displays, based on display data from the host device 100, a screen corresponding to the display data. As the display device 130, a liquid crystal display panel or the like may be used.

The storage device 114 stores an OS (not shown), the smoothing program PRO, the color conversion table 400, and the like. The OS, the smoothing program PRO, the color conversion table 400, and the like are read into the RAM 113 and used for a smoothing process. OS is an abbreviation for operating system. As the storage device 114, a nonvolatile semiconductor memory such as a flash memory, a magnetic storage device such as a hard disk, or the like may be used.

As the input device 115, a pointing device, hardware keys including a keyboard, a touch panel attached to a surface of a display panel, or the like may be used. The communication I/F 118 is connected to a communication I/F 210 of the printer 200 and receives and outputs information such as printing data from and to the printer 200. The colorimeter I/F 119 is connected to the colorimeter 120 and receives colorimetric data including colorimetric values from the colorimeter 120. As a standard for the I/Fs 118, 119, and 210, USE, a near-field communication standard, or the like may be used. USB is an abbreviation for Universal Serial Bus. Communication of the I/Fs 118, 119, and 210 may be wired communication, wireless communication, or network communication via a LAN, the Internet, or the like. LAN is an abbreviation for local area network.

The colorimeter 120 executes colorimetry on color patches PA1 formed on a print substrate ME1. The print substrate ME1 is an example of a medium on which a color chart CH1 is formed. The colorimeter 120 executes the colorimetry on color patches of a color chart displayed by a display device not shown and outputs colorimeter values. The patches are also referred to as color charts. The colorimetric values indicate lightness L and colorimetric coordinates a and b in the CIE Lab color space. The host device 100 acquires colorimetric data from the colorimeter 120 and executes various processes on the colorimetric data.

The smoothing program PRO shown in FIG. 3 causes the host device 100 to enable the coefficient calculating function FU1, the surface smoothing function FU2, the internal smoothing function FU3, and the smoothing intensity receiving function FU4. The coefficient calculating function FU1, the surface smoothing function FU2, and the internal smoothing function FU3 are included in a smoothing function of smoothing a color value of a grid point.

The CPU 111 of the host device 100 reads information stored in the storage device 114 into the RAM 113 and executes the read program to execute various processes. The CPU 111 executes the smoothing program PRO read and stored in the RAM 113, thereby executing the processes corresponding to the functions FU1 to FU4. The smoothing program PRO causes the host device 100 to function as the coefficient calculating unit U1, the surface smoothing unit U2, the internal smoothing unit U3, and the smoothing intensity receiving unit U4. The host device 100 is a computer. The host device 100 executes the smoothing program PRO and executes the coefficient calculation process ST1, the surface smoothing process ST2, the internal smoothing process ST3, and the smoothing intensity reception process ST4. The processes ST1 to ST4 are included in the smoothing method of causing the computer to execute a process of correcting the color values associated with the multiple grid points P1 arranged in the device-dependent color space CS1. A computer-readable storage medium storing the smoothing program PRO for causing the computer to enable the functions FU1 to FU4 is not limited to the internal storage device of the host device and may be an external storage device of the host device.

The host device 100 may be a computer such as a tablet terminal or a personal computer. For example, when a body of a laptop personal computer is applied to the host device 100, the display device 130, the colorimeter 120, and the printer 200 are normally connected to the body. When a computer that is a laptop personal computer or the like and is provided with a display device is applied to the host device 100, the colorimetric 120 and the printer 200 are normally connected to the computer. When the host device 100 is provided with a display device, display data is output to the display device included in the host device 100. The host device 100 may include all the constituent elements 111 to 119 in a single casing. Alternatively, the constituent elements 111 to 119 may be configured in multiple devices separated from each other so that the constituent elements 111 to 119 can communicate with each other. In addition, even when at least one of the display device 130, the colorimeter 120, and the printer 200 is included in the host device 100, the present technique is enabled.

The printer 200 shown in FIG. 3 is an ink jet printer that discharges at least C ink, M ink, Y ink, and K ink as color materials from a recording head 220 and forms an output image IM0 corresponding to printing data. The C, M, Y, and K ink is supplied from ink cartridges Cc, Cm, Cy, and Ck to the recording head 220. Nozzles Nc, Nm, Ny, and Nk jet C, M, Y, and K ink drops 280. When the ink drops 280 land on the print substrate ME1, ink dots are formed on the print substrate ME1. As a result, the print substrate ME1 has the output image IM0 thereon. When a profile that indicates a color production characteristic of the printer 200 is to be generated, the color chart CH1 with the patches PA1 corresponding to colors of grid points may be formed by the printer 200 on the print substrate ME1. The color conversion table including colorimetric values of the patches PA1 as color values (Lp, ap, and bp) is used as the A2B table for the generation of the profile.

(4) Specific Example of Smoothing Process

FIG. 4 exemplifies the smoothing process to be executed by the host device 100 shown in FIG. 3. The host device 100 executes multiple processes in parallel by multiple tasks. Step S102 corresponds to the smoothing intensity reception process ST4, the smoothing intensity receiving function FU4, and the smoothing intensity receiving unit U4. Steps S104 to S106 correspond to the coefficient calculation process ST1, the coefficient calculating function FU1, and the coefficient calculating unit U1. Step 3106 corresponds to the surface smoothing process ST2, the surface smoothing function FU2, and the surface smoothing unit U2. Steps S110 to S112 correspond to the internal smoothing process ST3, the internal smoothing function FU3, and the internal smoothing unit U3. Hereinafter, descriptions of "steps" are omitted.

In the smoothing process, after the color values of the surface grid points P2 are smoothed in S104 to S108, the color values of the internal grid points P5 are smoothed in S110 to S114. FIG. 4 shows that processes of smoothing the color values of the surface grid points P2 in S104 to S108 are surrounded by a broken line, processes of smoothing the color values of the internal grid points P5 in S110 to S114 are surrounded by a broken line, and the broken lines are surrounded by a solid line.

When the smoothing process is started, the host device 100 receives input color values corresponding to colors of the grid points P1 arranged in the device-dependent color space CS1 and input positional data of the grid points P1 in S100. When the positional data of the grid points P1 is represented by gradation values of 256 gradations and the number of grid points arranged in each of the axis directions is 17, the positional data of the grid points P1 is set to 0, 16, 32, . . . . In S100, the host device 100 executes a process of receiving the input gradation values as the positional data of the grid points P1.

Regarding the input of the color values, when the color conversion table 400 including the color values (Lp, ap, and bp) associated with the grid points P1 is stored in the storage device 114, the host device 100 reads the color conversion table 400 into the RAM 113 from the storage device 114. When a color conversion table 400 is to be newly generated, the host device 100 forms patches corresponding to the colors of the grid points P1 in the printer or the display device, causes the colorimeter 120 to execute the colorimetry on the patches, acquires color values or colorimetric values from the colorimeter 120, and associates the grid points P1 with the color values, thereby newly forming the color conversion table. The host device 100 may acquire the color conversion table 400 from an external device or a recording medium.

In subsequent S102, a smoothing intensity setting screen 800 shown in FIG. 4 is displayed by the display device 130. The smoothing intensity setting screen 800 includes slider control 810 that receives, as a single setting amount, a setting of a smoothing intensity for the color values of the surface grid points P2 and the color values of the internal grid points P5. The slider control 810 is an operational section for sensibly setting a smoothing intensity. An operation of moving a slider 814 along a slider bar 812 is received by the input device 115. The host device 100 sets the smoothing intensity based on the position of the slider 814 operated by a user, corrects the color values of the surface grid points P2 based on the set smoothing intensity, and corrects the color values of the internal grid points P5 to obtain the set smoothing intensity. The smoothing intensity corresponds to a rate c shown in FIG. 12. The rate c is changed at six stages from 0 indicating "low" to 1 indicating "high" and can be set to, for example, 0, 0.2, 0.4, 0.6, 0.8, and 1. The host device 100 holds the rate c corresponding to the received setting in at least one of the RAM 113 and the storage device 114.

In S102, the smoothing intensity setting corresponding to the correction rate c based on the polynomial approximation coefficients $a_0, \ldots,$ and $a_d$ is received and the smoothing intensity setting for the color values of the internal grid points P5 is received.

In subsequent S104, the host device 100 sets lines that are among multiple lines settable on the surface 510 of the grid point region 500 and correspond to the arrangement of the multiple first target grid points P10 that are among the multiple surface grid points P2 and to be subjected to the polynomial approximation. The lines are referred to as lines to be processed.

Figure 5:
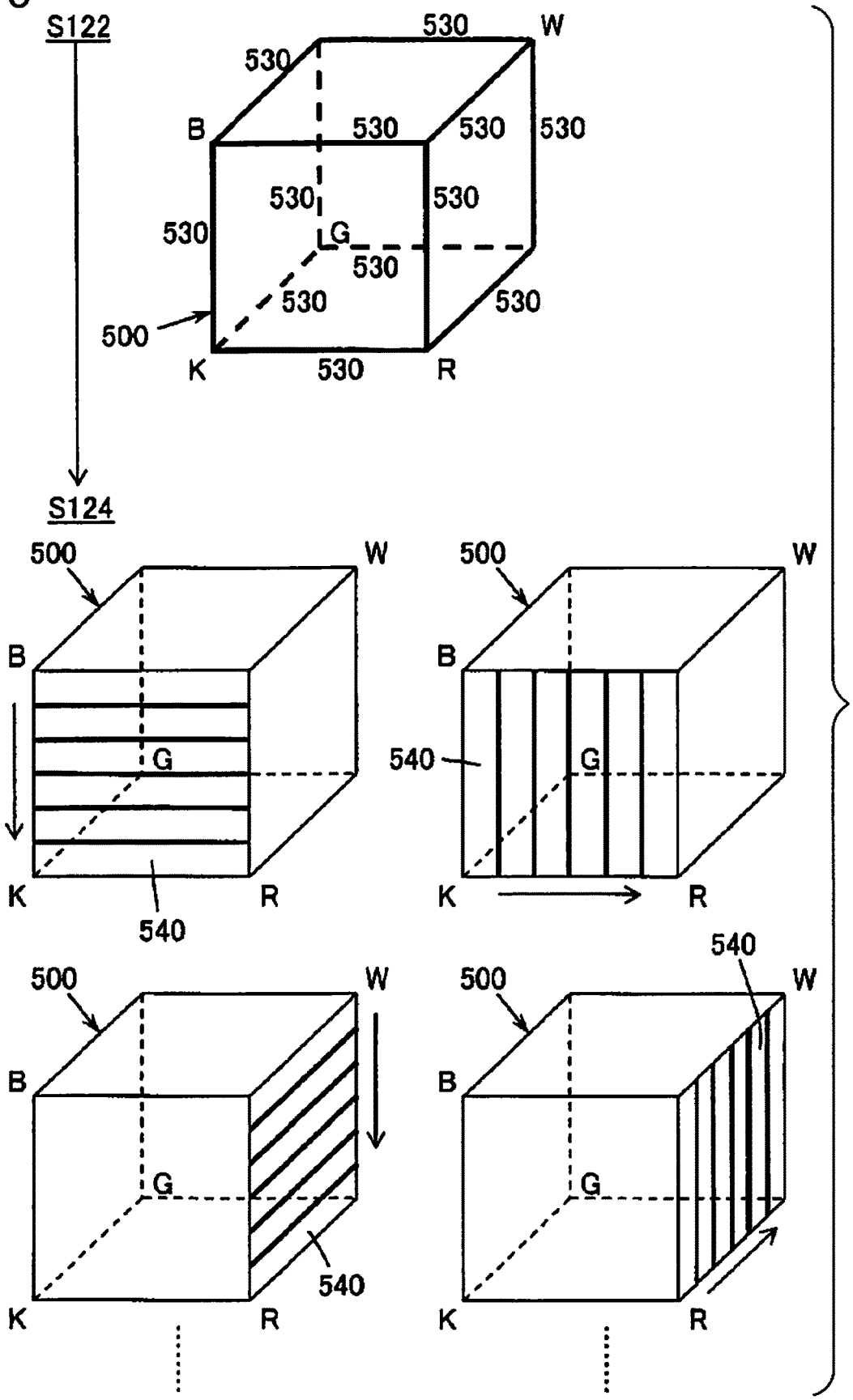
FIG. 5 is a diagram schematically showing an example in which lines to be subjected to polynomial approximation are set on surfaces of a three-dimensional grid point region.

FIG. 5 schematically exemplifies a state in which the lines to be processed are set on the surface 510 of the three-dimensional grid point region 500. The lines to be processed are ridgelines 530 and lines extending on the sectioned surfaces 540. In the specific example, the host device 100 sequentially sets all the ridgelines 530 in S122 and sequentially sets the multiple lines extending on the sectioned surfaces 540 in subsequent S124.

When the device-dependent color space CS1 is a three-dimensional RGB color space, 12 ridgelines 530 and 6 sectioned surfaces 540 exist. In this case, in S122, the host device 100 sequentially sets the lines to be processed from the 12 ridgelines 530. The ridgelines 530 extend in the first processing direction D1 in which the multiple first target grid points P10 are arranged. A number (2×(n−2)) of lines are settable at positions extending on each of the sectioned surfaces 540. For example, a number (n−2) of lines extending in the R axis direction are settable on a sectioned surface 540 including vertices of K, R, and B, and a number (n−2) of lines extending in the B axis direction are settable on the sectioned surface 540 including the vertices of K, R, and B. Thus, in S124, the host device 100 sequentially sets sectioned surfaces 540 to be processed from the 6 sectioned surfaces 540 and sequentially sets lines to be processed from a number (2×(n−2)) of lines on each of the sectioned surfaces 540 to be processed.

Although not shown, when the device-dependent color space CS1 is a four- or higher-dimensional color space, lines to be processed can be set in the same manner as a case in which the device-dependent color space CS1 is a three-dimensional color space.

FIG. 6 schematically exemplifies a state in which lines to be processed are set on a surface 510 of a four-dimensional grid point region 500. When the device-dependent color space CS1 is a four-dimensional CMYK color space, 32 ridgelines 530 and 24 sectioned surfaces 540 exist. In this case, in S122, the host device 100 sequentially sets lines to be processed from the 32 ridgelines 530. FIG. 6 shows coordinates of the 32 ridgelines 530. It is assumed that components C, M, Y, and K of the CMYK color space are in a range of values of 0 to 100 and change between 0 and 100 in a coordinate system. In subsequent S124, the host device 100 sequentially sets sectioned surfaces to be processed from the 24 sectioned surfaces 540 and sequentially sets lines to be processed from a number (2×(n−2)) of lines on each of the sectioned surfaces 540 to be processed. FIG. 6 shows coordinates of the 24 sectioned surfaces 540.

When the lines to be processed are ridgelines 530, all the multiple first target grid points P10 are ridgeline grid points P3. When the lines to be processed extend on the sectioned surfaces 540, the two edge grid points P11 among the multiple first target grid points P10 are ridgeline grid points P3, and multiple intermediate grid points P12 are sectioned surface grid points P4.

In S106 after S104 shown in FIG. 4, the host device 100 executes polynomial approximation on the multiple surface grid points P2 located on the lines to be processed and executes a surface smoothing process of smoothing color values.

Figure 7:
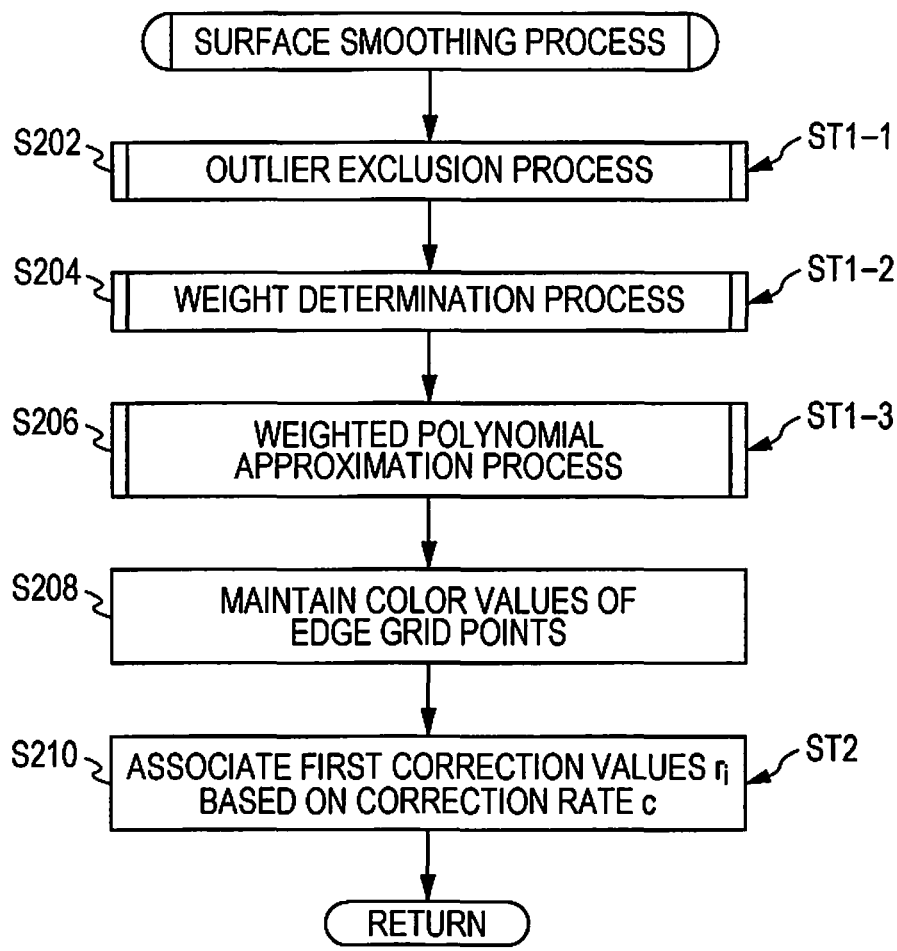
FIG. 7 is a flowchart of an example of a polynomial approximation correction process.

FIG. 7 exemplifies the surface smoothing process executable in S106. S202 to S206 correspond to the coefficient calculation process ST1, the coefficient calculating function FU1, and the coefficient calculating unit U1. A process of S202 corresponds to a process ST1-1 included in the coefficient calculation process ST1. A process of S204 corresponds to a process ST1-2 included in the coefficient calculation process ST1. A process of S206 corresponds to a process ST1-3 included in the coefficient calculation process ST1. S210 corresponds to the internal smoothing process ST2, the internal smoothing function FU2, and the internal smoothing unit U2. When a polynomial approximation correction process is started, the host device 100 executes an outlier exclusion process on the lines to be processed in S202, executes a weight determination process on the lines to be processed in S204, calculates the weighted polynomial approximation coefficients in a weighted polynomial approximation process in S206, and calculates approximate values. The outlier exclusion process of S202 is executed in order to suppress increases in weights of surface grid points having largely varying color values. The weight determination process of S204 is executed in order to maintain the shape of the gamut surface as much as possible. The weight determination process of S204 may not be executed. An effect is obtained by the outlier exclusion process not only when the weighted polynomial approximation is used but also when the polynomial approximation is used without a weight.

FIG. 8 exemplifies the outlier exclusion process executable in S202. The outlier exclusion process corresponds to the process ST1-1 included in the coefficient calculation process ST1. The coefficients $a_0, \ldots,$ and $a_d$ of the approximation equation for color values ($L_i$, $a_i$, and $b_i$) corresponding to the positions $x_i$ in the first processing direction D1 are calculated for each of the components L, a, and b. In S302 immediately after the start of the outlier exclusion process, the host device 100 sets components to be processed from the components L, a, and b of the color values. The color values $z_i$ indicate color values of the components to be processed.

In subsequent S304, the host device 100 calculates polynomial approximation coefficients $a_0, \ldots,$ and $a_d$ of a tentative approximation equation indicating tentative approximate values $y_i$ of the color values $z_i$ corresponding to the positions $x_i$. When four-order polynomial approximation is to be executed, the tentative approximation equation is the aforementioned Equation (1) or $y_i = a_4 x_i^4 + a_3 x_i^3 + a_2 x_i^2 + a_1 x_i + a_0$. The polynomial approximation coefficients $a_0, \ldots,$ and $a_4$ that are not weighted can be calculated according to the following equation.

$$A = (X'X)^{-1} X'Z \qquad (4)$$

In subsequent S306, the host device 100 uses the tentative approximation equation including the polynomial approximation coefficients $a_0, \ldots,$ and $a_4$ to calculate tentative approximate values $y_i$ of the first target grid points P10.

In subsequent S308, the host device 100 calculates distances $\Delta z_i$ from the tentative approximate values $y_i$ to the color values $z_i$ for the first target grid points P10.

$$\Delta z_i = |z_i - y_i| \qquad (5)$$

In subsequent S310, the host device 100 branches the process based on whether all the components L, a, and b of the color values are already set. When a component remains unset, the hose device 100 repeatedly executes the processes of S302 to S310. When all the components L, a, and b are already set, the host device 100 acquires the maximum value among the distances $\Delta z_i$ based on all the components L, a, and b and determines whether the maximum value is smaller than a threshold T1 in S312. The threshold T1 is not limited but may be a positive integer in a range of 2 to 5. When the maximum value among the distances $\Delta z_i$ is equal to or larger than the threshold T1, the host device 100 excludes, from the multiple first target grid points P10, a grid point P15 that is to be excluded and has a color value whose distance $\Delta z_i$ from a tentative approximate value is the maximum value in S314. After that, the host device 100 causes the process to return to S302. When the maximum value among the distances $\Delta z_i$ is smaller than the threshold T1 in S312, the host device 100 terminates the outlier exclusion process. Thus, the outlier exclusion process is executed until the maximum value among the distances $\Delta z_i$ is smaller than the threshold T1.

As described above, whether the first target grid points P10 are grid points P15 to be excluded is determined based on the color values of the multiple first target grid points P10. A grid point P15 to be excluded is excluded from the multiple first target grid points P10 upon the weighted polynomial approximation described later.

FIG. 9 exemplifies the weight determination process executable in S204 shown in FIG. 7. The weight determination process corresponds to the process ST1-2 included in the coefficient calculation process ST1. The weight determination process is executed to determine weights $w_i$ of the first target grid points P10 for the weighted polynomial approximation to be executed after the weight determination process. FIG. 10 schematically exemplifies a weight $w_m$ of an extreme grid point P13 appearing at a first target grid point P10 among the multiple first target grid points P10 excluding the grid points at both edges.

In S402 immediately after the start of the weight determination process, the host device 100 sets, to 1, weights $w_i$ of first target grid points P10 excluding a grid point P15 to be excluded. At this time, the grid point P15 to be excluded is excluded from the multiple first target grid points P10. However, when a weight of the grid point P15 to be excluded is set to 0, the grid point P15 may not be excluded and the subsequent weighted polynomial approximation process may be executed.

In subsequent S404, the host device 100 acquires color values $z_0$ and $z_n$ of the edge grid points P11 that are among the multiple first target grid points P10 and located at the edges in the first processing direction D1. S404 is executed in order to maintain, as much as possible, the shape of a surface that is included in the surface of the gamut and on which a color value changes to a value larger than a range of the color values $z_0$ and $z_n$. FIG. 10 shows color values $z_i$ corresponding to the positions $x_i$ in the first processing direction D1 when $z_0 < z_n$.

In subsequent S406, the host device 100 searches an extreme grid point P13 having a color value $z_i$ larger than the range of the color values $z_0$ and $z_n$. FIG. 10 shows extreme grid points P13 having local maximum values $z_m$ larger than the color value $z_n$ in results 1 and 4. In S408, the host device 100 searches an extreme grid point P13 having a color value $z_i$ lower than the range of the color values $z_0$ and $z_n$. FIG. 10 shows extreme grid points P13 having local minimum values $z_m$ lower than the color value $z_0$ in results 2, 3, and 5.

In subsequent S410, the host device 100 branches the process based on whether the number of extreme grid points P13 found in S406 and S408 is 1. When the number of extreme grid points P13 found in S406 and S408 is 1, the host device 100 increases a weight $w_m$ of the found extreme grid point P13 in S412. After that, the host device 100 terminates the weight determination process. The weight $w_m$ is not limited but may be a value larger than 1 or may be in a range of 2 to 20. On the other hand, when the number of extreme grid points P13 found in S406 and S408 is 0 or 2 or more, the host device 100 terminates the weight determination process without changing the weights of the first target grid points P10.

For example, in the result 1 shown in FIG. 10, the single extreme grid point P13 that is among the multiple intermediate grid points P12 exists at a position $x_m$ corresponding to a color value $z_m$ serving as a local maximum value and larger than the color values $z_0$ and $z_n$ of the edge grid points P11. In this case, a weight $w_m$ of the extreme grid point P13 is larger than 1.

In the result 2 shown in FIG. 10, the single extreme grid point P13 that is among the multiple intermediate grid points P12 exists at a position $x_m$ corresponding to a color value $z_m$ serving as a local minimum value and smaller than the color values $z_0$ and $z_n$ of the edge grid points P11. In this case, a weight $w_m$ of the extreme grid point P13 is larger than 1.

In the result 3 shown in FIG. 10, two extreme grid points P13 that are among the multiple intermediate grid points P12 exist. A weight $w_m$ of an extreme grid point that is among the extreme grid points P13 and has a color value $z_m$ smaller than the color value $z_0$ is larger than 1, while a weight $w_m$ of an extreme grid point that is among the extreme grid points P13 and has a color value $z_m$ smaller than the color value $z_n$ and larger than $z_0$ is 1.

In the result 4 shown in FIG. 10, an extreme grid point P13 that is among the multiple intermediate grid points P12 exists at a position corresponding to a color value $z_m$ serving as a local minimum value and smaller than the color value $z_0$ that is smaller than the color value $z_n$, and an extreme grid point P13 that is among the multiple intermediate grid points P12 exists at a position corresponding to a color value $z_m$ serving as a local maximum value and larger than the color value $z_n$ that is larger than the color value $z_0$. In this case, weights $w_m$ of the extreme grid points P13 are 1.

In the result 5 shown in FIG. 10, two extreme grid points P13 exist among the multiple intermediate grid points P12. Since color values $z_m$ of the two extreme grid points P13 are smaller than the color value $z_n$ and larger than the color value $z_0$, weights $w_m$ of the two extreme grid points P13 are 1.

In the aforementioned manner, the host device 100 determines weights $w_i$ of the first target grid points P10 based on the color values $z_i$ of the multiple first target grid points P10. The weights $w_i$ of the first target grid points P10 are used to calculate the weighted polynomial approximation coefficients $a_0, \ldots,$ and $a_4$. When a single extreme grid point P13 exists among multiple first target grid points P10 excluding a grid point P15 to be excluded and has a color value $z_i$ corresponding to a position $x_i$ and serving as an extreme larger or smaller the range of the color values $z_0$ and $z_n$ of the edge grid points P11 located at the edges in the first processing direction D1, a weight $w_m$ of the extreme grid point P13 is the largest among the weights $w_i$ of the first target grid points P10.

Figure 11:
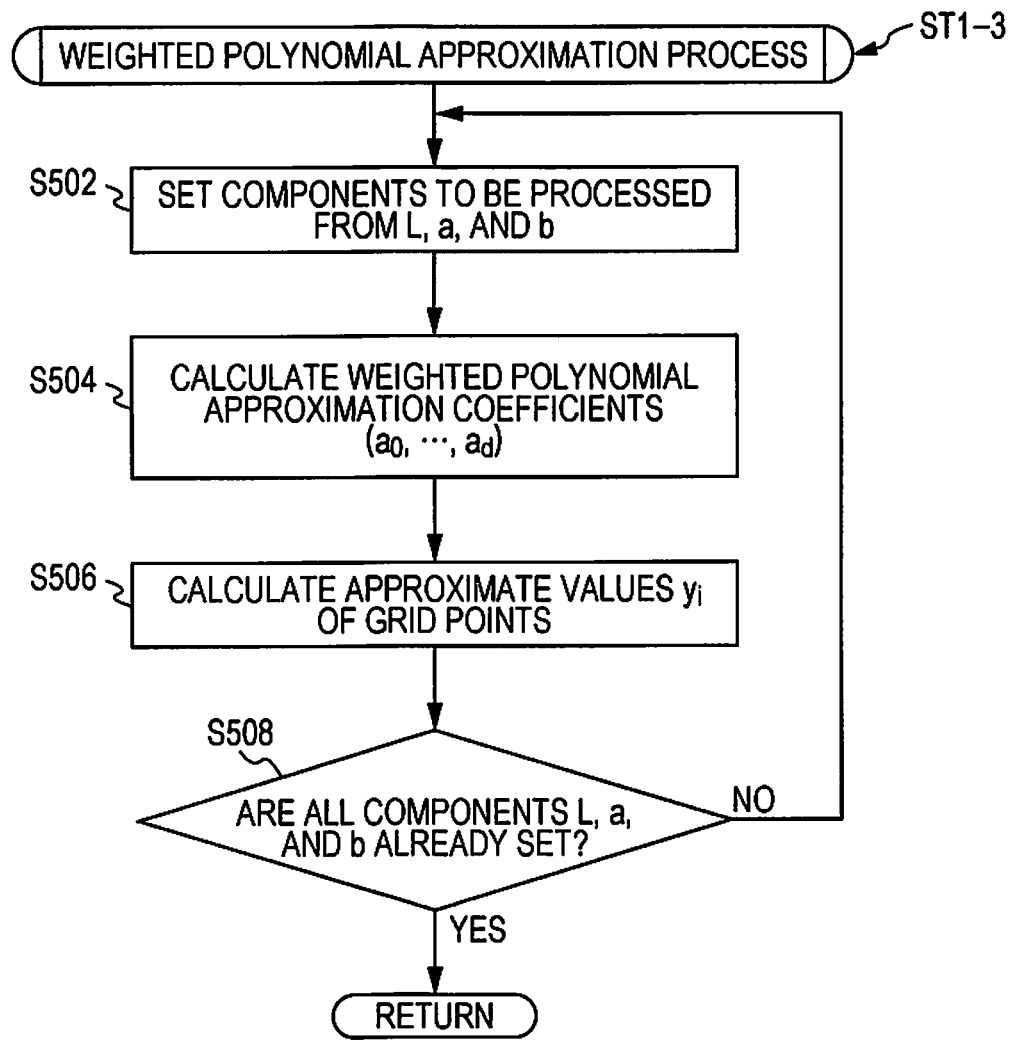
FIG. 11 is a flowchart of an example of a weighted polynomial approximation process.

FIG. 11 exemplifies the weighted polynomial approximation process executable in S206 shown in FIG. 7 or a process of calculating the weighted polynomial approximation coefficients and the approximate values. The weighted polynomial approximation process corresponds to the process ST1-3 included in the coefficient calculation process ST1. The weighted polynomial approximation process is executed to calculate the approximate values $y_i$ as a preprocess of correcting the color values $z_i$ of the first target grid points P10.

In S502 immediately after the start of the weighted polynomial approximation process, the host device 100 sets components to be processed from the components L, a, and b of the color values. The color values $z_i$ indicate color values of the components to be processed.

In subsequent S504, the host device 100 calculates the weighted polynomial approximation coefficients $a_0, \ldots,$ and $a_d$ of the approximation equation indicating the approximate values of the color values $z_i$ corresponding to the positions $x_i$. When a grid point P15 to be excluded is included in the multiple first target grid points P10 arranged in the first processing direction D1, the process of S504 is executed on the first target grid points P10 excluding the grid point P15 to be excluded. When the four-order polynomial approximation is to be executed, the approximation equation is the aforementioned Equation (1) or $y_i = a_4 x_i^4 + a_3 x_i^3 + a_2 x_i^2 + a_1 x_i + a_0$.

The weighted polynomial approximation coefficients $a_0, \ldots,$ and $a_4$ are calculated according to the aforementioned Equation (2) or $A = (X'WX)^{-1} X'WZ$.

In subsequent S506, the host device 100 uses the approximation equation (1) including the weighted polynomial approximation coefficients $a_0, \ldots,$ and $a_4$ to calculate the approximate values $y_i$ of the first target grid points P10. Since an approximate value $y_i$ needs to be obtained for the grid point P15 to be excluded, the process of S506 is executed on the multiple first target grid points P10 including the grid point P15 to be excluded.

In subsequent S508, the host device 100 branches the process based on whether all the components L, a, and b of the color values are already set. When a component remains unset, the host device 100 repeatedly executes the processes of S502 to S508. When all the components L, a, and b are already set, the host device 100 terminates the weighted polynomial approximation process.

In the aforementioned manner, the host device 100 calculates the weighted polynomial approximation coefficients $a_0, \ldots,$ and $a_d$ used in the approximation equation for calculating the approximate values $y_i$ of the color values $z_i$ corresponding to the positions $x_i$ in the first processing direction D1 for the multiple first target grid points P10 arranged in the first processing direction D1.

After the weighted polynomial approximation process, the host device 100 executes a process of maintaining the color values $z_0$ and $z_n$ of the edge grid points P11 that are among the multiple first target grid points P10 and located at the edges in the first processing direction D1 in S208 shown in FIG. 7. The process of S208 may be a process of replacing approximate values $y_0$ and $y_n$ corresponding to the positions $x_0$ and $x_n$ of the edge grid points P11 with the original color values $z_0$ and $z_n$.

In subsequent S210, the host device 100 associates the first correction values $r_i$ based on the correction rate c corresponding to the smoothing intensity set in S102 shown in FIG. 4 with the first target grid points P10. The first correction values $r_i$ are based on the polynomial approximation coefficients $a_0, \ldots,$ and $a_d$ in a case in which the color values of the first target grid points P10 are corrected. After that, the host device 100 terminates the polynomial approximation correction process.

Figure 12:
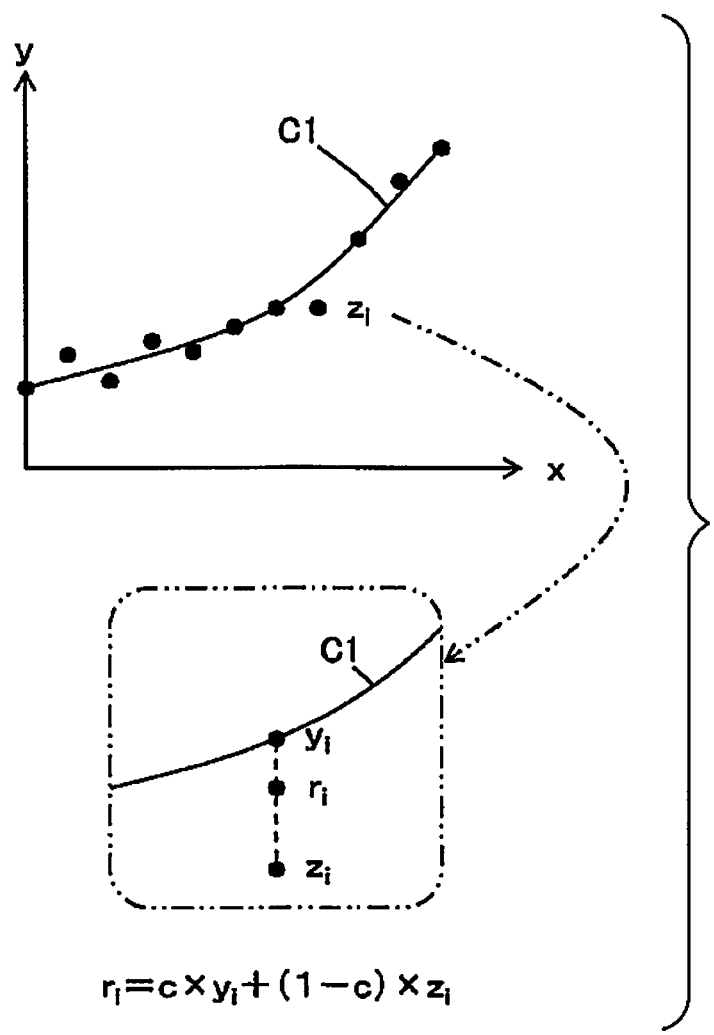
FIG. 12 is a diagram schematically showing an example in which color values are corrected based on a smoothing intensity.

FIG. 12 schematically exemplifies a state in which the color values $z_i$ are corrected based on the correction rate c in S210 shown in FIG. 7. A correction process shown in FIG. 12 is a process of calculating weighted averages of the approximate values $y_i$ based on the polynomial approximation coefficients $a_0, \ldots,$ and $a_d$ and the original color values $z_i$ using the ratio of c: (1−c). An approximate curve C1 shown in FIG. 12 indicates the approximate values $y_i$ for the positions $x_i$ of the first target grid points P10. The first correction values $r_i$ are calculated according to the following Equation (6).

$$r_i = c \times y_i + (1-c) \times z_i \tag{6}$$

When the correction rate c is 1, the first correction values $r_i$ of the multiple first target grid points P10 excluding the edge grid points P11 are equal to the approximate values $y_i$. When the correction rate c is 0, the first correction values $r_i$ of the multiple first target grid points P10 are equal to the original color values $z_i$.

As described above, the host device 100 uses, as the correction rate c, a weight for the approximate values $y_i$ obtained by the polynomial approximation to associate the weighted averages, serving as the first correction values $r_i$, of the approximate values $y_i$ and the color values $z_i$ with the first target grid points P10.

In S108 after S106 shown in FIG. 4, the host device 100 branches the process based on whether all the lines settable on the surface 510 of the grid point region 500 are already set on the surface 510. When a line remains unset on the surface 510, the host device 100 repeatedly executes the processes of S104 to S108. When all the lines are already set on the surface 510, the host device 100 causes the process to proceed to S110.

As shown in FIGS. 5 and 6, lines to be processed are sequentially set from the multiple ridgelines 530. In this case, a line to be processed is set for each of the vertices 520 multiple times. Since the color values of the edge grid points P11 located at vertices 520 are maintained, correction values for the color values of the ridgeline grid points P3 do not depend on the order in which the lines that are the multiple ridgelines 530 and to be processed are set.

After the polynomial approximation coefficients $a_0, \ldots,$ and $a_d$ are calculated for the multiple ridgeline grid points P13 by setting all the ridgelines 530 as lines, and the color values are corrected by the polynomial approximation equation, the polynomial approximation coefficients $a_0, \ldots,$ and $a_d$ are calculated for the multiple sectioned surface grid points P4, and the color values are corrected by the polynomial approximation equation. Since the color values of the edge grid points P11 located on the ridgelines 530 are maintained, the correction values for the color values of the ridgeline grid points P3 on the sectioned surfaces 540 and correction values for the color values of the sectioned surface grid points P4 on the sectioned surfaces 540 do not depend on the order in which the lines are set. A reduction in the color reproduction range is appropriately suppressed by setting all the ridgelines 530 as the lines.

In subsequent S110, the host device 100 sets a line that is among multiple lines settable at positions extending in the internal region 550 of the grid point region 500 and corresponds to the arrangement of multiple second target grid points P20 that are among the multiple grid points P1 and to be subjected to smoothing.

Figure 13:
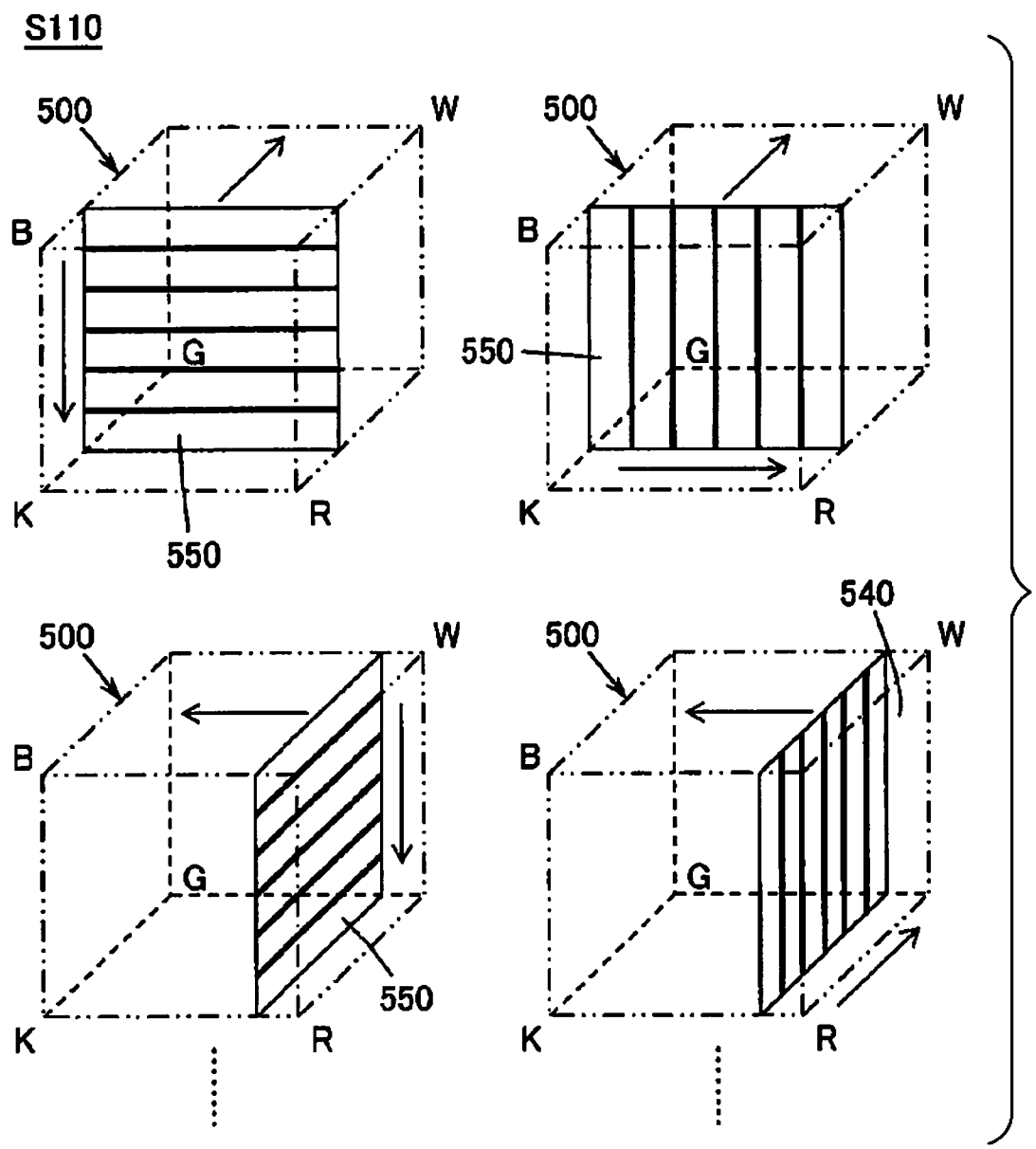
FIG. 13 is a diagram schematically showing an example in which lines to be subjected to smoothing are set at positions extending in the three-dimensional grid point region.

FIG. 13 schematically exemplifies a state in which lines that are to be processed and on which the smoothing is executed at positions extending in the internal region 550 of the three-dimensional grid point region 500 are set. When the device-dependent color space CS1 is a three-dimensional RGB color space, cross-sections that are perpendicular to the R axis and extend through multiple internal grid points P5 are a number (n−2) of planes, cross-sections that are perpendicular to the G axis and extend through multiple internal grid points P5 are a number (n−2) of planes, and cross-sections that are perpendicular to the B axis and extend on multiple internal grid points P5 are a number (n−2) of planes. A number (2×(n−2)) of lines are settable on each of the cross-sections. For example, a number (n−2) of lines extending in the G axis are settable on each of the cross-sections perpendicular to the R axis, and a number (n−2) of lines extending in the B axis are settable on each of the cross-sections perpendicular to the R axis. Thus, the host device 100 sequentially sets cross-sections to be processed from a number (3×(n−2)) of cross-sections and sequentially sets lines to be processed from a number (2×(n−2)) of lines for the cross-sections to be processed.

Although not shown, when the device-dependent color space CS1 is a four- or higher-dimensional color space, lines to be processed can be set in the same manner as a case in which the device-dependent color space CS1 is a three-dimensional color space.

When a line to be processed extends in the internal region 550 of the grid point region 500, surface grid points P2 that are among the multiple second target grid points P20 and located at the edges in the second processing direction D2 are sectioned surface grid points P4, and remaining grid points among the multiple second target grid points P20 are internal grid points P5, as shown in FIG. 2.

In S112 after S110 shown in FIG. 4, the host device 100 smoothes the color values $z_i$ of the multiple internal grid points P5 on lines to be processed. The internal smoothing process executed in S112 is different from the polynomial approximation and can be treated as a process of executing the weighted averaging described with reference to FIGS. 2 and 14.

FIG. 14 schematically exemplifies a state in which weighted averages $y_i$ as a result of the smoothing of the color values $z_i$ of the multiple internal grid points P5 included in the multiple second target grid points P20 are calculated. FIG. 14 shows a filter F1 for calculating the weighted averages $y_i$. FIG. 15 schematically exemplifies the filter F1 for calculating the weighted averages $y_i$ of the color values $z_i$ based on weights associated with the set smoothing intensity. The filter F1 shown in FIGS. 14 and 15 has weights $w_j$ applied to color values $z_{i+j}$ of 5 internal grid points including an internal grid point located at a processing position $x_i$ and treated as the center of the 5 internal grid points. In this case, j is a variable identifying an internal grid point P5 to which a weight is applied in a case in which the processing position $x_i$ is treated as the center. The number of weights $w_j$ of the filter F1 is not limited to 5 and may be 3 or may be 7 or more. The number of weights $w_j$ of the filter F1 may be set based on a number n of grid points arranged in each of the axis directions.

The weighted averages $y_i$ are calculated according to the aforementioned Equation (3) or the following equation.

$$y_i = \frac{\sum_{j=-s}^{s} w_j \cdot z_{i+j}}{\sum_{j=-s}^{s} w_j}$$

The weights $w_j$ of the filter F1 change in a stepwise manner based on the smoothing intensity set in S102 shown in FIG. 4, as shown in FIG. 15. The smoothing intensity corresponds to the rate c shown in FIG. 12 as a value. For example, when the smoothing intensity is 1, the smoothing intensity is highest and all the weights $w_j$ is 1. In this case, the weighted averages $y_i$ are simple averages of the color values $z_{i+j}$. The simple averages are included in the weighted averages $y_i$. When the smoothing intensity is 0.8 that is second highest, weights $w_{-1}$, $w_0$, and $w_1$ are 1, and weights $w_{-2}$ and $w_2$ are 0.5. When the smoothing intensity is 0 that is lowest, the weight $w_0$ is 1, and the weights $w_{-2}$, $w_{-1}$, $w_1$, and $w_2$ are 0. In this case, the weighted averages $y_i$ are equal to the original color values $z_i$. The color values $z_i$ are included in the weighted averages $y_i$.

As described above, the host device 100 treats, as the second correction values, weighted averages $y_i$ of color values $z_{i+j}$ associated with grid points including grid points adjacent to each other in the second processing direction D2 and associates the weighted averages $y_i$ as the second correction values with the multiple second target grid points P20 that are among the multiple internal grid points P5 and arranged in the second processing direction D2. Thus, the color values $z_i$ associated with the internal grid points P5 are smoothed with the set smoothing intensity.

In S114 after S112 shown in FIG. 4, the host device 100 branches the process based on whether all the lines settable at the positions extending in the internal region 550 of the grid point region 500 are already set. When a line extending in the internal region 550 of the grid point region 500 remains unset, the host device 100 repeatedly executes the processes of S110 to S114. When all the lines are already set at the positions extending in the internal regions 550, the host device 100 terminates the smoothing process.

FIG. 16 shows results of comparing a case in which color values of surface grid points are corrected by the weighted polynomial approximation with a case in which the color values of the surface grid points are corrected by the weighted averaging for the color conversion table that is before the correction and includes, as color values (Lp, ap, and bp), colorimetric values of patches corresponding to colors of grid points arranged in the CMYK color space. In FIG. 16, circles indicate chromaticity coordinates a and b on a ridgeline indicating colors from white to cyan in the case in which the color values are corrected by the weighted polynomial approximation, crosses indicate the chromaticity coordinates a and b on the ridgeline indicating the colors from white to cyan in the case in which the color values are corrected by the weighted averaging, and a broken line indicates the chromaticity coordinates a and b on the ridgeline indicating the colors from white to cyan before the correction.

Ridgelines in the grid point region included in the CMYK color space correspond to the surface of the gamut in the Lab color space. Thus, the chromaticity coordinates a and b shown in FIG. 16 correspond to gamut surface shapes indicated in the color conversion table.

As shown in FIG. 16, when the color values are corrected by the weighted averaging, the chromaticity coordinates b on the ridgeline indicating the colors from white to cyan are smaller than those before the correction. This is considered to be due to the fact that a bulge of the surface of the gamut is reduced by the weighted averaging executed on the color values. When the color values are corrected by the weighted polynomial approximation, the chromaticity coordinates b on the ridgeline indicating the colors from white to cyan are the same as or almost the same as those before the correction and larger than those in the case in which the color values are corrected by the weighted averaging. This is considered to be due to the fact that a variation in the color values is reduced and a change in the shape of the gamut surface can be reduced. FIG. 16 shows that smooth gradation expression can be enabled while a change in the shape of the gamut surface is damaged as little as possible.

As described above, this specific example can provide the smoothing method for enabling smooth gradation expression while suppressing a change in the shape of the original gamut surface, compared with the case in which the color values associated with the multiple surface grid points are averaged.

Color values in the gamut are smoothed by correcting the color values of the internal grid points P5 after the correction of the color values of the surface grid points P2 by the polynomial approximation, while a change in the shape of the gamut surface is damaged as little as possible. Thus, smooth gradation expression is enabled, while a change in the shape of the gamut surface is suppressed as much as possible. In addition, the color values of the internal grid points P5 are quickly corrected by applying weighted averages on the color values of the internal grid points P5.

(5) Modified Examples

Various modified examples are considered in the disclosure.

For example, the output device is not limited to the ink jet printer 200 and may be an electrophotographic printer such as a laser printer using toner as color materials, a three-dimensional printer, a display device, or the like.

Color materials that form an image are not limited to the C, M, Y, and K ink and may include not only the C, M, Y, and K ink but also Lc, Lm, DY, Or, Gr, and Lk ink and an uncolored material for image quality improvement. The Lc ink has a lower color density than the C ink, the Lm ink has a lower color density than the M ink, the DY ink has a higher color density than the Y ink, and the Lk ink has a lower color density than the K ink. Lc indicates light cyan, Lm indicates light magenta, DY indicates dark yellow, Or indicates orange, Gr indicates green, and Lk indicates light black.

The aforementioned processes may be changed. The order in which the processes are executed may be changed, one or more of the processes may be omitted, and another process may be added to the processes. For example, in the weight determination process shown in FIG. 9, the process of S408 may be executed before the process of S406.

In the embodiment, the processes may be executed in a state in which the smoothing intensities for the color values of the surface grid points P2 do not include the intensity corresponding to 0. The process of S102 shown in FIG. 4 may be omitted. The approximate values $y_i$ may be treated as the first correction values and associated with the surface grid points P2. A weight $w_{i+j}$ of the filter F1 may be a fixed value.

In the embodiment, the smoothing intensity for the color values of the surface grid points P2 is associated with the smoothing intensity for the color values of the internal grid points P5. However, the smoothing intensity for the surface grid points and the smoothing intensity for the internal grid points may be separately received.

In the polynomial approximation correction process shown in FIG. 7, the process of maintaining the color values $z_0$ and $z_n$ of the edge grid points P11 in S208 may be omitted, and the first correction values may be associated with the multiple first target grid points P10 excluding the edge grid points P11 in S210.

In addition, the polynomial approximation coefficients $a_0, \ldots,$ and $a_d$ may be determined so that the approximate values $y_0$ and $y_n$ corresponding to the positions $x_0$ and $x_n$ of the edge grid points P11 are equal to the original color values $z_0$ and $z_n$.

When approximate values are calculated by the polynomial approximation process based on the polynomial approximation coefficients for color values associated with at least some of the multiple surface grid points P2 and are smoothed, an effect of enabling smooth gradation expression while suppressing a change in the shape of the gamut surface as much as possible is obtained by the smoothing of the color values associated with the multiple grid points.

Thus, the aforementioned effect is obtained even when approximate values are calculated for the color values of the multiple internal grid points P5 by the polynomial approximation process based on the polynomial approximation coefficients and are smoothed or even when the color values of the multiple internal grid points P5 are not corrected.

In addition, the aforementioned effect is obtained even when the weighted polynomial approximation is not executed on the color values of the multiple surface grid points P2 and the polynomial approximation is executed on the color values of the multiple surface grid points P2 without using a weight.

(6) Conclusion

As described above, according to the disclosure, each of the aspects can provide a technique for enabling smooth gradation expression while suppressing a change in the shape of the gamut surface as much as possible. Even in a technique enabled by only configuration requirements according to each of independent claims, the aforementioned basic effects are obtained.

In addition, a configuration obtained by replacing configurations among the configurations described in the aforementioned examples with each other, a configuration obtained by changing a combination of configurations among the configurations described in the aforementioned examples, a configuration obtained by replacing a configuration among the configurations described in the aforementioned examples with a configuration of a known technique, a configuration obtained by changing a combination of a configuration among the configurations described in the aforementioned examples and a configuration of a known technique, and the like are enabled. The disclosure includes these configurations.

What is claimed is:

1. A smoothing method of smoothing color values associated with a plurality of grid points that are arranged in a device-dependent color space and include a plurality of surface grid points arranged on a surface of a grid point region in which the plurality of grid points is arranged in the device-dependent color space, comprising:
   calculating, based on color values associated with a plurality of first target grid points, polynomial approximation coefficients to be used in a polynomial approximation equation for calculating approximate values of color values corresponding to positions on a line that extends in a first processing direction in the device-dependent color space through the first target grid points and is different from a ridgeline of the grid point region extending through vertices of the grid point region, the first target grid points being among the surface grid points and arranged in the first processing direction in the device-dependent color space; and
   smoothing color values associated with the first target grid points using the polynomial approximation equation when the color values associated with the first target grid points are to be smoothed.

2. The smoothing method according to claim 1, wherein the first processing direction is along any of a plurality of axes included in the device-dependent color space.

3. The smoothing method according to claim 1, wherein the first processing direction is along any of a plurality axes included in the device-dependent color space,
   the device-dependent color space is a D-dimensional color space with a number D of axes, where the number D is 3 or more,
   the grid point region includes a number $2^D$ of vertices,
   the surface of the grid point region includes a plurality of ridgelines connecting the vertices to each other and includes a plurality of surfaces sectioned by the ridgelines,
   a plurality of sectioned surface grid points that are among the plurality of surface grid points and arranged on the sectioned surfaces is arranged in a first axis direction and a second axis direction different from the first axis direction,
   the first processing direction is set to the first axis direction, and the coefficient calculation and the smoothing are executed on the plurality of sectioned surface grid points, and
   the first processing direction is set to the second axis direction, and the coefficient calculation and the smoothing are executed on the plurality of sectioned surface grid points.

4. A smoothing method of smoothing color values associated with a plurality of grid points that are arranged in a device-dependent color space and include a plurality of surface grid points arranged on a surface of a grid point region in which the plurality of grid points is arranged in the device-dependent color space, comprising:

calculating polynomial approximation coefficients to be used in a polynomial approximation equation for calculating approximate values of color values corresponding to positions in a first processing direction in the device-dependent color space for a plurality of first target grid points that are among the surface grid points and arranged in the first processing direction in the device-dependent color space; and smoothing color values associated with the first target grid points using the polynomial approximation equation when the color values associated with the first target grid points are to be smoothed, the polynomial approximation coefficients including weighted polynomial approximation coefficients to be used in a weighted polynomial approximation equation for calculating approximate values of the color values corresponding to the positions in the first processing direction in the device-dependent color space, and in the coefficient calculation, weights of the first target grid points being determined based on the color values associated with the first target grid points, and the weighted polynomial approximation coefficients being calculated based on the determined weights.

5. The smoothing method according to claim 4, wherein in the coefficient calculation, when a single extreme grid point having a color value that serves as an extreme and is any of the color values corresponding to the positions and is larger or smaller than color values associated with edge grid points that are among the plurality of first target grid points and located at both edges in the first processing direction exists among the plurality of first target grid points, a weight of the extreme grid point is the largest among the weights of the first target grid points, and the weighted polynomial approximation coefficients are calculated.

6. A smoothing method of smoothing color values associated with a plurality of grid points that are arranged in a device-dependent color space and include a plurality of surface grid points arranged on a surface of a grid point region in which the plurality of grid points is arranged in the device-dependent color space, comprising:

calculating polynomial approximation coefficients to be used in a polynomial approximation equation for calculating approximate values of color values corresponding to positions in a first processing direction in the device-dependent color space for a plurality of first target grid points that are among the surface grid points and arranged in the first processing direction in the device-dependent color space; and smoothing color values associated with the first target grid points using the polynomial approximation equation when the color values associated with the first target grid points are to be smoothed, in the coefficient calculation, whether a grid point that is to be excluded and is not used to calculate the polynomial approximation coefficients exists among the plurality of first target grid points being determined based on the color values associated with the first target grid points, and the grid point to be excluded being excluded from the plurality of first target grid points, and the polynomial approximation coefficients being calculated.

7. The smoothing method according to claim 1, wherein the device-dependent color space is a D-dimensional color space with a number D of axes, where the number D is 3 or more, the grid point region includes a number $2^D$ of vertices, the surface of the grid point region includes a plurality of ridgelines connecting the vertices to each other and includes a plurality of surfaces sectioned by the plurality of ridgelines, and after the coefficient calculation and the smoothing are executed on a plurality of ridgeline grid points that are among the plurality of surface grid points and arranged on the ridgelines, the coefficient calculation and the smoothing are executed on a plurality of sectioned surface grid points that are among the plurality of surface grid points and arranged on the sectioned surfaces.

8. The smoothing method according to claim 1, wherein the plurality of grid points includes a plurality of internal grid points arranged in an internal region included in the grid point region, and the smoothing method further comprises executing internal smoothing to smooth color values associated with the internal grid points by a smoothing process different from the smoothing using the polynomial approximation equation.

9. The smoothing method according to claim 1, wherein the plurality of grid points includes a plurality of internal grid points arranged in an internal region included in the grid point region, the smoothing method further comprises executing internal smoothing to smooth color values associated with the internal grid points by a smoothing process different from the smoothing using the polynomial approximation equation, and in the internal smoothing, weighted averages of color values associated with grid points including grid points adjacent to each other in a second processing direction are associated with a plurality of second target grid points that are among the plurality of internal grid points and arranged in the second processing direction in the device-dependent color space.

10. The smoothing method according to claim 1, wherein the plurality of grid points includes a plurality of internal grid points arranged in an internal region included in the grid point region, the smoothing method further comprises executing internal smoothing to smooth color values associated with the internal grid points by a smoothing process different from the smoothing using the polynomial approximation equation, in the internal smoothing, weighted averages of color values associated with grid points including grid points adjacent to each other in a second processing direction are associated with a plurality of second target grid points that are among the plurality of internal grid points and arranged in the second processing direction in the device-dependent color space, and the second processing direction is along any of a plurality of axes included in the device-dependent color space.

11. The smoothing method according to claim 1, wherein the plurality of grid points includes a plurality of internal grid points arranged in an internal region included in the grid point region, the smoothing method further comprises executing internal smoothing to smooth color values associated with the internal grid points by a smoothing process different from the smoothing using the polynomial approximation equation, in the internal smoothing, weighted averages of color values associated with grid points including grid points adjacent to each other in a second processing direction are associated with a plurality of second target grid points that are among the plurality of internal grid points and arranged in the second processing direction in the device-dependent color space, the second processing direction is along any of a plurality of axes included in the device-dependent color space, the device-dependent color space is a D-dimensional color space with a number D of axes, where the number D is 3 or more, the plurality of internal grid points is arranged in axis directions that are along the number D of axes, and the second processing direction is sequentially set to the axis directions that are along the number D of axes, each of the axis directions is sequentially treated as the second processing direction, and the internal smoothing is executed on the plurality of internal grid points.

12. The smoothing method according to claim 1, further comprising:

receiving an intensity of the smoothing using the polynomial approximation equation, and in the smoothing, a weight for the approximate values calculated using the polynomial approximation equation is treated as a rate corresponding to the intensity, and weighted averages of the approximate values of the first target grid points and the color values associated with the first target grid points are associated with the first target grid points.

13. A smoothing device that smooths color values associated with a plurality of grid points that are arranged in a device-dependent color space and include a plurality of surface grid points arranged on a surface of a grid point region in which the plurality of grid points is arranged, comprising:

a processor that calculates, based on color values associated with a plurality of first target grid points, polynomial approximation coefficients to be used in a polynomial approximation equation for calculating approximate values of color values corresponding to positions on a line that extends in a first processing direction in the device-dependent color space through the first target grid points and is different from a ridge line of the grid point region extending through vertices of the grid point region, the first target grid points being among the plurality of surface grid points and arranged in the first processing direction in the device-dependent color space, the processor using the polynomial approximation equation to smooth color values associated with the first target grid points when the color values associated with the first target grid points are to be smoothed.

14. A computer-readable storage medium storing a smoothing program for smoothing color values associated with a plurality of grid points that are arranged in a device-dependent color space and include a plurality of surface grid points arranged on a surface of a grid point region in which the plurality of grid points is arranged, the program causing a computer to enable:

a coefficient calculating function of calculating, based on color values associated with a plurality of first targe grid points, polynomial approximation coefficients to be used in a polynomial approximation equation for calculating approximate values of color values corresponding to positions on a line that extends in a first processing direction in the device-dependent color space through the first target grid points and is different from a ridgeline of the grid point region extending through vertices of the grid point region, the first target grid points being among the plurality of surface grid points and arranged in the first processing direction in the device-dependent color space; and a smoothing function of smoothing color values associated with the first target grid points using the polynomial approximation equation when the color values associated with the first target grid points are to be smoothed.

* * * * *